(12) United States Patent
Watson et al.

(10) Patent No.: US 12,551,337 B2
(45) Date of Patent: Feb. 17, 2026

(54) PROSTHETIC IMPLANT, DELIVERY SYSTEM AND DELIVERY APPARATUS

(71) Applicants: SINGAPORE HEALTH SERVICES PTE LTD, Singapore (SG); APPARENT LLC, Santa Rosa, CA (US)

(72) Inventors: James R. Watson, Santa Rosa, CA (US); Carl H. Poppe, Sebastopol, CA (US)

(73) Assignees: SINGAPORE HEALTH SERVICES PTE LTD, Singapore (SG); APPARENT LLC, Santa Rosa, CA (US)

( * ) Notice: Subject to any disclaimer, the term of this patent is extended or adjusted under 35 U.S.C. 154(b) by 437 days.

(21) Appl. No.: 18/028,677

(22) PCT Filed: Sep. 10, 2021

(86) PCT No.: PCT/SG2021/050547
§ 371 (c)(1),
(2) Date: Mar. 27, 2023

(87) PCT Pub. No.: WO2022/066097
PCT Pub. Date: Mar. 31, 2022

(65) Prior Publication Data
US 2023/0363898 A1    Nov. 16, 2023

Related U.S. Application Data

(60) Provisional application No. 63/084,477, filed on Sep. 28, 2020.

(30) Foreign Application Priority Data

Jan. 27, 2021   (SG) .......................... 10202100895W

(51) Int. Cl.
A61F 2/24    (2006.01)

(52) U.S. Cl.
CPC .......... *A61F 2/2418* (2013.01); *A61F 2/2436* (2013.01)

(58) Field of Classification Search
CPC ................. A61F 2/2418; A61F 2/2436; A61F 2220/0091; A61F 2/2442; A61F 2/2463;
(Continued)

(56) References Cited

U.S. PATENT DOCUMENTS

2004/0260317 A1* 12/2004 Bloom ................. A61F 2/2487
606/151
2005/0075727 A1* 4/2005 Wheatley ............. A61F 2/2457
623/902

(Continued)

FOREIGN PATENT DOCUMENTS

WO    2013173618 A2    11/2013
WO    2017/217932 A1   12/2017
(Continued)

OTHER PUBLICATIONS

The Extended European Search Report dated Oct. 2, 2024 corresponding to application No. 21873071.1-1113.

*Primary Examiner* — Yashita Sharma
(74) *Attorney, Agent, or Firm* — Nath, Goldberg & Meyer; Joshua B. Goldberg

(57) ABSTRACT

A prosthetic implant including an anchor member; at least one resilient tethering strut extending from the anchor member; a coaptation structure coupled to an end of the at least one resilient tethering strut; and a tensioning unit extending between the anchor member and the coaptation structure. The tensioning unit including a flexible hollow tubing, and a tensioning wire extending therethrough with a first end of the tensioning wire fixed at a junction between a first end of the flexible hollow tubing and the coaptation (Continued)

structure and with a second end of the tensioning wire extending out from a second end of the flexible hollow tubing. The second end of the tensioning wire being pullable away from the second end of the flexible hollow tubing to bend the flexible hollow tubing and the at least one resilient tethering strut to move the coaptation structure relative to the anchor member.

20 Claims, 9 Drawing Sheets

(58) Field of Classification Search
CPC ....... A61F 2/2466; A61B 90/06; A61B 90/08; A61B 17/12122; A61B 2017/00309; A61B 2017/00314; A61B 2017/00323; A61B 2017/0409; A61B 2017/0462; A61B 2017/0464; A61B 2017/0496; A61B 2017/0618; A61B 2090/064; A61B 2090/0807; A61B 17/0401

See application file for complete search history.

(56) References Cited

U.S. PATENT DOCUMENTS

| | | |
|---|---|---|
| 2011/0022164 A1 | 1/2011 | Quinn et al. |
| 2011/0066233 A1 | 3/2011 | Thornton et al. |
| 2017/0056176 A1 | 3/2017 | Rowe et al. |
| 2017/0209137 A1* | 7/2017 | Gilmore .................. A61F 2/915 |
| 2018/0132858 A1 | 5/2018 | Coleman et al. |
| 2021/0145580 A1* | 5/2021 | Griffin .................... A61F 2/915 |

FOREIGN PATENT DOCUMENTS

| | | |
|---|---|---|
| WO | 2020/040699 A1 | 2/2020 |
| WO | 2020197854 A1 | 10/2020 |

* cited by examiner

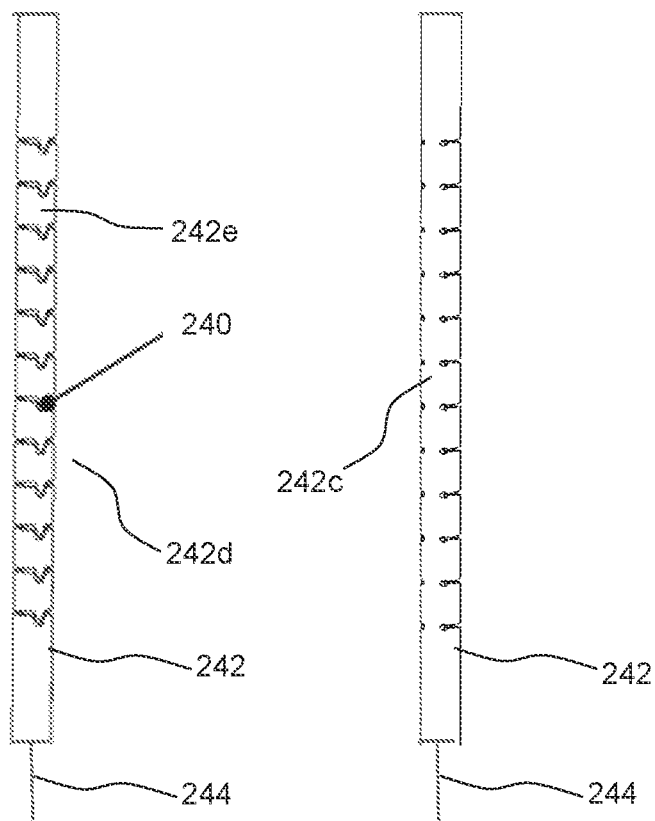
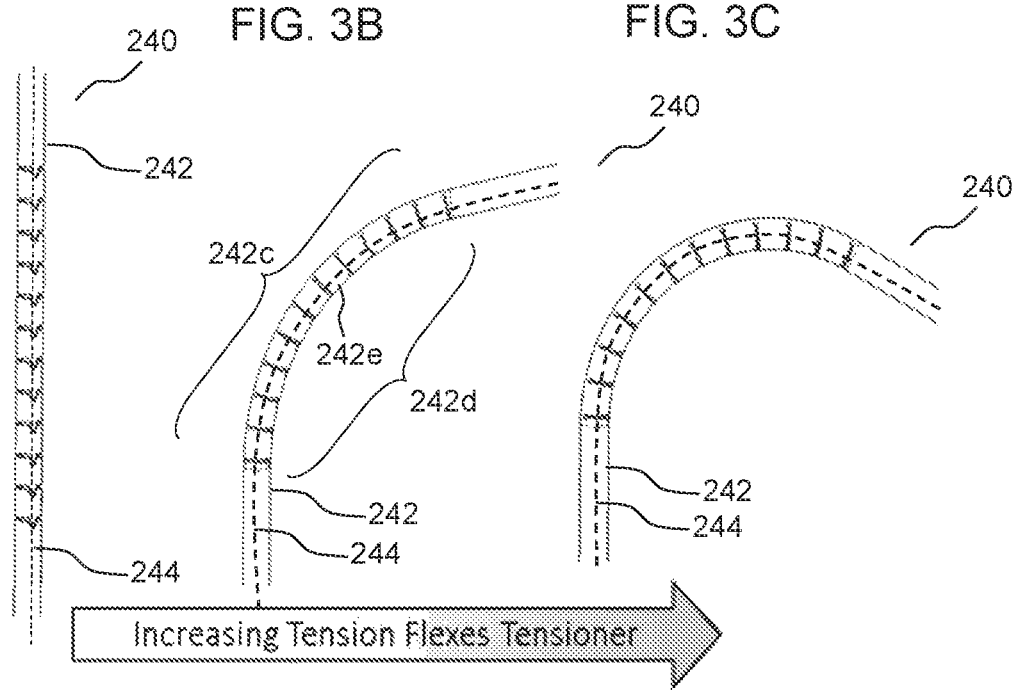
FIG. 3B  FIG. 3C
FIG. 4

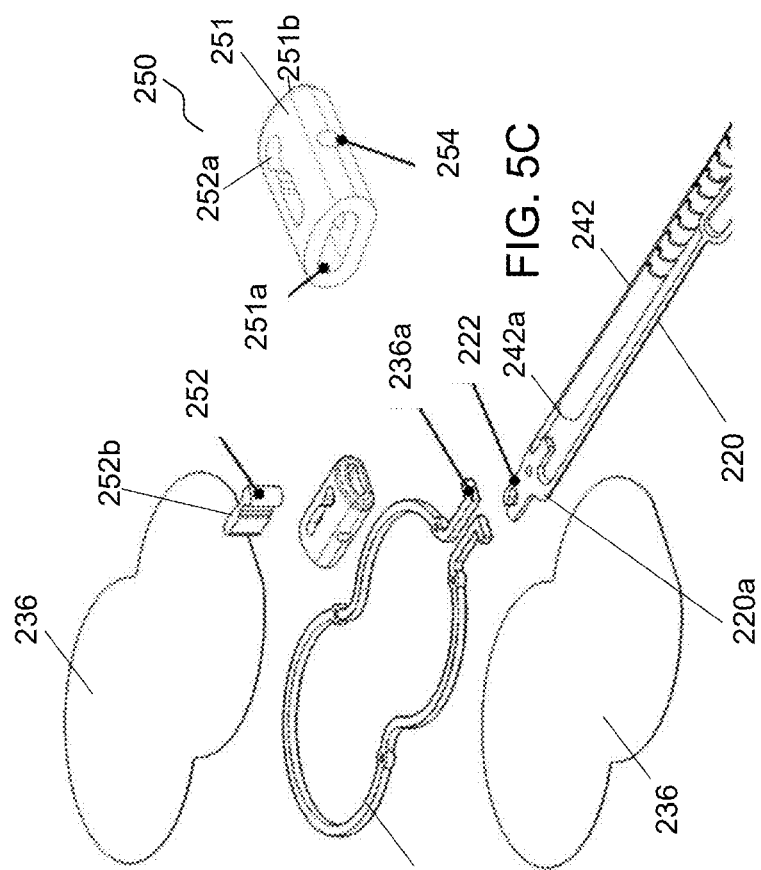
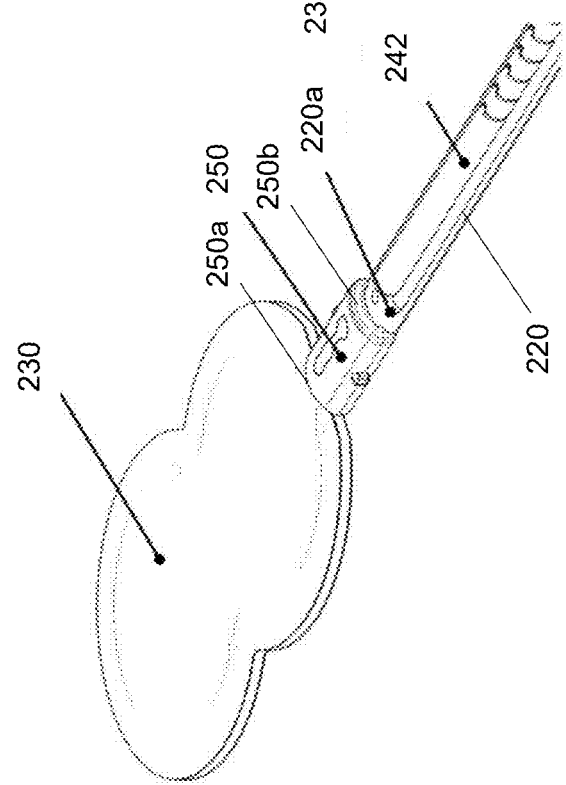

PROSTHETIC IMPLANT, DELIVERY SYSTEM AND DELIVERY APPARATUS

CROSS REFERENCES TO RELATED APPLICATIONS

This is a National Phase Application filed under 35 U.S.C. 371 as a national stage of PCT/SG2021/050547 filed Sep. 10, 2021, an application claiming the benefit of U.S. Provisional Application No. 63/084,477, filed Sep. 28, 2020, and Singapore Application No. 10202100895W, filed Jan. 27, 2021, the content of each of which is hereby incorporated by reference in its entirety.

TECHNICAL FIELD

Various embodiments generally relate to a prosthetic implant, a delivery system for the prosthetic implant, and a delivery apparatus for the prosthetic implant. In particular, various embodiments generally relate to a prosthetic valve implant, a delivery system for the prosthetic valve implant, and a delivery apparatus for the prosthetic valve implant.

BACKGROUND

Historically, valvular insufficiency, such as tricuspid regurgitation (TR), was repaired using open-heart procedures. These high risk procedures, performed under general anesthesia, typically involve providing circulatory support by a heart-lung bypass machine, as the patient's heart is stopped during surgery. Risks are significant and recovery is painful and difficult.

Accordingly, the preferred valve repair procedure for TR is increasingly performed using significantly less invasive percutaneous transluminal valve replacement procedures, as these procedures dramatically reduce the risks of open-heart surgery. In principle, replacement valves are configured to function much as the diseased valve being replaced, including valve leaflets. Thus, when using mechanical replacement valves, the procedure involves sizing the replacement valve for a patient-specific fit.

Delivery of replacement valves, such as tricuspid valves, entails loading the valve onto a delivery device, such as an on-the-wire or over-the-wire catheter in a compressed configuration, passing it percutaneously to the affected area, positioning and securing it, and then removing the delivery device to complete the deployment. The replacement valve may then be sewed to secure it in place.

Accordingly, there is a need for a simpler and easier solution for heart valve replacement.

SUMMARY

According to various embodiments, there is provided a prosthetic implant (or a prosthetic valve implant). The prosthetic implant may include an anchor member. The prosthetic implant may include at least one resilient tethering strut extending from the: anchor member. The prosthetic implant may include a coaptation structure coupled to an end of the at least one resilient tethering strut away from the anchor member. The prosthetic implant may include a tensioning unit extending between the anchor member and the coaptation structure. The tensioning unit may include a flexible hollow tubing extending between the anchor member and the coaptation structure, and a tensioning wire extending through the flexible hollow tubing with a first end of the tensioning wire fixed at a junction between a first end of the flexible hollow, tubing and the coaptation structure and with a second end of the tensioning wire extending out from a second end of the flexible hollow tubing. The second end of the tensioning wire may be drawable relative to the flexible hollow tubing to be pulled away from the second end of the flexible hollow tubing to bend the flexible hollow tubing in a manner so as to corresponding bend the at least one resilient tethering strut to move the coaptation structure relative to the anchor member.

According to various embodiments, there is provided a prosthetic implant delivery system. The prosthetic implant delivery system may include the prosthetic implant as described herein and a delivery apparatus. The delivery apparatus may include an outer sheath with the prosthetic implant compressed and constrained within a first end portion of the outer sheath. The delivery apparatus may include a tensioning rod enclosed within the outer sheath. The tensioning rod may have a first end portion removably coupled to the second end of the tensioning wire of the tensioning unit of the prosthetic implant. The delivery apparatus may include a control handle at a second end portion of the outer sheath. The control handle may include a first control interface associated with the second end portion of the outer sheath and operable to retract the outer sheath for deploying the prosthetic implant. The control handle may include a second control interface associated with a second end portion of the tensioning rod and operable to retract or extend the tensioning rod with respect to the control handle to move the second end of the tensioning wire relative to the flexible hollow tubing so as to adjust a displacement of the second end of the tensioning wire from the second end of the flexible hollow tubing to correspondingly adjust a degree of bending of the flexible hollow tubing and a degree of bending of the at least one resilient tethering strut for positioning the coaptation structure relative to the anchor member. The control handle may include a third control interface associated with a second end portion of the tensioning rod and operable to decouple the first end portion of the tensioning rod from the second end of the tensioning wire of the tensioning unit of the prosthetic implant.

According to various embodiments, there is provided a delivery apparatus for. the prosthetic implant as described herein. The delivery apparatus may include an outer sheath to compress and constrain the prosthetic implant in a first end portion of the outer sheath. The delivery apparatus may include a tensioning rod enclosed within the outer sheath. The tensioning rod may have a first end portion removably couplable to the second end of the tensioning wire of the tensioning unit of the prosthetic implant. The delivery apparatus may include a control handle at a second end portion of the outer sheath. The control handle may include a first control interface associated with the second end portion of the outer sheath and operable to retract the outer sheath for deploying the prosthetic implant. The control handle may include a second control interface associated with a second end portion of the tensioning rod and operable to retract or extend the tensioning rod with respect to the control handle for moving the second end of the tensioning wire relative to the flexible hollow tubing so as to adjust a displacement of the second end of the tensioning wire from the second end of the flexible hollow tubing to correspondingly adjust a degree of bending of the flexible hollow tubing and a degree of bending of the at least one resilient tethering strut for positioning the coaptation structure relative to the anchor member. The control handle may include a third control interface associated with a second end portion of the tensioning rod and operable to decouple the first end of the tensioning rod from the second end of the tensioning wire of the tensioning unit of the prosthetic implant.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 3B and FIG. 3C show an example of the tensioning unit of FIG. 3A according to various embodiments;

FIG. 4 shows three tensioning units with varying amount of curvature according to various embodiments;

FIG. 5A shows an assembled view of a valve leaflet prosthesis, a coupler, at least one resilient tethering strut, and the tensioning unit of the prosthetic valve implant of FIG. 2 according to various embodiments;

FIG. 5B shows a disassembled view of FIG. 5A according to various embodiments;

FIG. 5C shows an enlarged view of the coupler according to various embodiments;

DETAILED DESCRIPTION

Figure 1A:
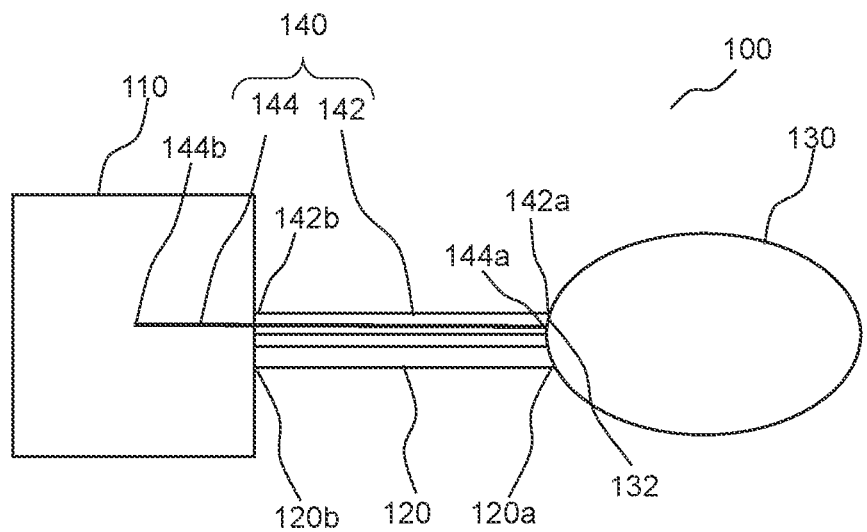
FIG. 1A shows a schematic diagram of a prosthetic implant (or a prosthetic valve implant or a valve implant) according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a prosthetic implant, a delivery system for the prosthetic implant, and a delivery apparatus for the prosthetic implant. In particular, various embodiments generally relate to a prosthetic valve implant, a delivery system for the prosthetic valve implant, and a delivery apparatus for the prosthetic valve implant. According to various embodiments, the prosthetic implant may be a prosthetic valve implant or a valve implant. According to various embodiments, the prosthetic valve implant or the valve implant may serve as a replacement valve, for example, to be used in replacing a diseased valve within a heart. According to various embodiments, the prosthetic valve implant or the valve implant may be used for valve replacement procedure for tricuspid regurgitation (TR). According to various embodiments, the delivery system may be configured to percutaneously deliver the prosthetic implant (or the prosthetic valve implant or the valve implant) into a body of a patient, for example, the patient's heart for replacing the diseased valve. According to various embodiments, the delivery apparatus may be configured to control a deployment and/or positioning and/or orienting of the prosthetic implant (or the prosthetic valve implant or the valve implant). Various embodiments may also relate to respective methods. For example, various embodiments, may also relate to a method of deploying and/or positioning and/or orienting the prosthetic implant (or the prosthetic valve implant or the valve implant), a method of operating the delivery apparatus to implant the prosthetic implant (or the prosthetic valve implant or the valve implant), or a method of implanting the prosthetic implant (or the prosthetic valve implant or the valve implant) with the delivery system.

According to various embodiments, the prosthetic implant (or the prosthetic valve implant or the valve implant) may include a coaptation structure for coapting with at least one native valve leaflet and/or to provide a surface on which at least one native valve leaflet may coapt against; an anchor member for anchoring or securing the prosthetic implant (or the prosthetic valve implant or the valve implant) to one or more tissue sites; and a tensioning unit extending between the coaptation structure and the anchor member, wherein relative position and/or orientation of the coaptation structure with respect to the anchor member may be adjusted via adjusting a tension of the tensioning unit. For example, the tensioning unit may include a flexible tube which may bend or flex upon application of a pulling force to adjust a tension of a tensioning wire within the flexible tube so as to move the coaptation structure with respect to the anchor member for positioning and/or orienting the coaptation structure. Accordingly, the tensioning unit may provide a simple, efficient and effective solution for fine control or adjustment of the position and/or orientation of the coaptation structure to achieve a desired or optimal disposition or placement of the coaptation structure during implantation.

According to various embodiments, the delivery apparatus may include a tensioning mechanism, wherein the prosthetic implant (or the prosthetic valve implant or the valve implant) may be connectable to the tensioning mechanism of the delivery apparatus. Further, the delivery apparatus may include an adjustable user input element or control interface (e.g. a tension dial) for adjusting a tension of the tensioning wire of tensioning unit of the prosthetic implant (or the prosthetic valve implant or the valve implant) via the tensioning mechanism and another adjustable user input element or control interface (e.g. a release knob) for disconnecting the tensioning mechanism of the delivery apparatus from the prosthetic implant (or the prosthetic valve implant or the valve implant).

According to various embodiments, the delivery system may include the prosthetic implant (or the prosthetic valve implant or the valve implant) of the various embodiments and the delivery apparatus of the various embodiments.

The following examples pertain to various embodiments.

According to various embodiments, there is provided a prosthetic implant (or a prosthetic valve implant). The prosthetic implant may include an anchor member. The prosthetic implant may include at least one resilient tethering strut extending from the anchor member. The prosthetic implant may include a coaptation structure coupled to an end of the at least one resilient tethering strut away from the anchor member. The prosthetic implant may include a tensioning unit extending between the anchor member and the coaptation structure. The tensioning unit may include a flexible hollow tubing extending between the anchor member and the coaptation structure, and a tensioning wire extending through the flexible hollow tubing with a first end of the tensioning wire fixed at a junction between a first end of the flexible hollow tubing and the coaptation structure and with a second end of the tensioning wire extending out from a second end of the flexible hollow tubing. The second end of the tensioning wire may be drawable relative to the flexible hollow tubing to be pulled away from the second end of the flexible hollow tubing to bend the flexible hollow tubing in a manner so as to corresponding bend the at least one resilient tethering strut to move the coaptation structure relative to the anchor member.

According to various embodiments, the prosthetic implant as described in the paragraph immediately above may optionally include a coupler coupling the coaptation structure to the end of the at least one resilient tethering strut. The coupler may have a first connection end to receive the coaptation structure and a second connection end to receive the end of the at least one resilient tethering strut. A main axis of the coupler may extend between the first connection end and the second connection end. The coaptation structure may be fitted to the first connection end of the coupler with rotational play about the main axis of the coupler and pivoting play about a transverse axis perpendicular to the main axis of the coupler.

According to various embodiments, the prosthetic implant as described in the paragraph immediately above may optionally include that the coaptation structure may include a pair of L-shaped connection legs with feet pointing in opposite directions away from each other. The coupler may include a hollow coupler body comprising a first opening at the first connection end and a pair of side-holes in opposite wall portions of the hollow coupler body. The pair of side-holes may be coaxial with the transverse axis. A height of the first opening in a height direction perpendicular to the main axis and the transverse axis may be larger than a thickness of the pair of L-shaped connection legs. The pair of L-shaped connection legs of the coaptation structure may be inserted into the first opening at the first connection end of the coupler with the feet of the pair of L-shaped connection legs respectively fitted into the pair of side-holes.

According to various embodiments, the prosthetic implant as described in the paragraph immediately above may optionally include that each of the pair of side-holes may be a slot parallel to the height direction of the first opening at the first connection end.

According to various embodiments, the prosthetic implant as described in any one of the two preceding paragraphs above may optionally include that the end of the at least one resilient tethering strut may include a pin-hole or key-hole. The hollow coupler body of the coupler may include a second opening at the second connection end and a corresponding pin-hole or key-hole in a wall portion of the hollow coupler body. The end of the at least one resilient tethering strut may be inserted into the second opening at the second connection end of the coupler and a locking pin or key may be inserted through the corresponding pin-hole or key-hole of the hollow coupler body of the coupler and into the pin-hole or key-hole of the end of the at least one resilient tethering strut to lock the at least one resilient tethering strut to the coupler.

According to various embodiments, the prosthetic implant as described in the paragraph immediately above may optionally include that the locking pin or key may have a spacer portion inserted between the pair of L-shaped connection legs of the coaptation structure to keep the pair of L-shaped connection legs apart so as to retain the feet of the pair of L-shaped connection legs respectively fitted into the pair of side-holes of the hollow coupler body.

According to various embodiments, the prosthetic implant as described in any one of the six preceding paragraphs above may optionally include that the first end of the flexible hollow tubing of the tensioning unit may be coupled to the end of the at least one resilient tethering strut and the second end of the flexible hollow tubing of the tensioning unit is coupled to the anchor member.

According to various embodiments, the prosthetic implant as described in any one of the seven preceding paragraphs above may optionally include that the tensioning unit may further include a locking component fixed at the second end of the tensioning wire. The locking component may be movable relative to the anchor member to draw the second end of the tensioning wire relative to the flexible hollow tubing for pulling the second end of the tensioning wire away from the second end of the flexible hollow tubing. The locking component may be lockable to the anchor member so as to fix the second end of the tensioning wire, when a desired displacement from the second end of the flexible hollow tubing is reached, in a manner such that a curvature of the flexible hollow tubing, a curvature of the at least one resilient tethering strut and a relative disposition of the coaptation structure with respect to the anchor member may be fixed.

According to various embodiments, the prosthetic implant as described in the paragraph immediately above may optionally include that the anchor member may include a slider strut, and the locking component may include a lock housing having a slider bracket with a gap therebetween for fitting the slider strut therethrough such that the locking component is in sliding engagement with the slider strut.

According to various embodiments, the prosthetic implant as described in the paragraph immediately above may optionally include that the slider strut of the anchor member may include a plurality of locking holes lined at regular intervals longitudinally along the slider strut. The locking component may include a spring-loaded locking pin directed perpendicularly to the slider strut. The locking component may be operable to hold the spring-loaded locking pin in a retracted position within the lock housing for sliding the locking component relative to the slider strut and operable to release the spring-loaded locking pin to protrude from the lock housing into a protruded position for engaging with at least one of the plurality of locking holes to lock the locking component to the slider strut of the anchor member.

According to various embodiments, the prosthetic implant as described in the paragraph immediately above may optionally include that the spring-loaded locking pin may include a pin and a leaf spring. The pin may be coupled to a free end of the leaf spring and another end of the leaf spring may be fixedly coupled to the lock housing of the locking component.

According to various embodiments, the prosthetic implant as described in any one of the two preceding paragraphs above may optionally include that, in the protruded position, the spring-loaded locking pin may protrude from the lock housing into the gap between the slider bracket and the lock housing.

According to various embodiments, prosthetic implant as described in any one of the twelve preceding paragraphs above may optionally include that the flexible hollow tubing may include a slotted tubing, a ribbed tubing, a corrugated bellows tubing, an interlock tubing, a mesh tubing or a braided tubing.

According to various embodiments, the prosthetic implant as described in any one of the thirteen preceding paragraphs above may optionally include that the flexible hollow tubing may have directional flexibility.

According to various embodiments, the prosthetic implant as described in the paragraph immediately above may optionally include that the flexible hollow tubing may include a first sector extending continuously from the first end of the flexible hollow tubing to the second end of the flexible hollow tubing to form a spine portion, and a second sector with a plurality of spaced ribs lined at regular intervals from the first end of the flexible hollow tubing to the second end of the flexible hollow tubing to form a ribbed portion.

According to various embodiments, the prosthetic implant as described in the paragraph immediately above may optionally include that the plurality of spaced ribs may be formed by a plurality of parallel transverse cuts along second sector of the flexible hollow tubing.

According to various embodiments, the prosthetic implant as described in the paragraph immediately above may optionally include that each of the plurality of transverse cuts may have a V-shaped or a U-shaped cut segment.

According to various embodiments, the prosthetic implant as described in any one of the seventeen preceding paragraphs above may optionally include that the anchor member may include a stent and the coaptation structure may include a valve leaflet prosthesis.

According to various embodiments, there is provided a prosthetic implant delivery system. The prosthetic implant delivery system may include the prosthetic implant as described in any one of the eighteen preceding paragraphs above and a delivery apparatus. The delivery apparatus may include an outer sheath with the prosthetic implant compressed and constrained within a first end portion of the outer sheath. The delivery apparatus may include a tensioning rod enclosed within the outer sheath. The tensioning rod may have a first end portion removably coupled to the second end of the tensioning wire of the tensioning unit of the prosthetic implant. The delivery apparatus may include a control handle at a second end portion of the outer sheath. The control handle may include a first control interface associated with the second end portion of the outer sheath and operable to retract the outer sheath for deploying the prosthetic implant. The control handle may include a second control interface associated with a second end portion of the tensioning rod and operable to retract or extend the tensioning rod with respect to the control handle to move the second end of the tensioning wire relative to the flexible hollow tubing so as to adjust a displacement of the second end of the tensioning wire from the second end of the flexible hollow tubing to correspondingly adjust a degree of bending of the flexible hollow tubing and a degree of bending of the at least one resilient tethering strut for positioning the coaptation structure relative to the anchor member. The control handle may include a third control interface associated with a second end portion of the tensioning rod and operable to decouple the first end portion of the tensioning rod from the second end of the tensioning wire of the tensioning unit of the prosthetic implant.

According to various embodiments, the prosthetic implant delivery system as described in the paragraph immediately above may optionally include that, when the prosthetic implant include the spring-loaded locking pin and the lock housing, the first end portion of the tensioning rod may include a retaining element in engagement with the spring-loaded locking pin of the locking component to hold the spring-loaded locking pin in the retracted position. The retaining element may be withdrawable to disengage from the spring-loaded locking pin of the locking component so as to release the spring-loaded locking pin for engaging the slider strut.

According to various embodiments, the prosthetic implant delivery system as described in the paragraph immediately above may optionally include that the first end portion of the tensioning rod may include a coupling element in engagement with the locking component to removably couple the first end portion of the tensioning rod to the locking component.

According to various embodiments, the prosthetic implant delivery system as described in any one of the two preceding paragraphs above may optionally include that the retaining element may include an insert tip portion. The insert tip portion may be inserted perpendicularly to the spring-loaded locking pin to hold the spring-loaded locking pin in the retracted position. The insert tip portion may be withdrawable to release the spring-loaded locking pin for engaging the slider strut.

According to various embodiments, the prosthetic implant delivery system as described in the paragraph immediately above may optionally include that the coupling element may include a threaded stem portion adjacent the insert tip portion. The threaded stem portion may be screwed into the lock housing of the locking component with the inset tip portion inserted perpendicularly to the spring-loaded locking pin in the retracted position. The threaded stem portion may be capable of being partially unscrewed with respect to the lock housing of the locking component to withdraw the insert tip portion from the spring-loaded locking pin so as to release the spring-loaded locking pin and fully unscrewed from the lock housing of the locking component to decouple the first end portion of the tensioning rod from the locking component.

According to various embodiments, the prosthetic implant delivery system as described in any one of the five preceding paragraphs above may optionally include that the second control interface may include a rotatable dial. The rotatable dial may be rotatable about a longitudinal axis of the control handle. The control handle may include a rotary to linear motion mechanism interconnecting the rotatable dial and the tensioning rod to convert a rotary motion of the rotatable dial to a linear translation motion of the tensioning rod.

According to various embodiments, the prosthetic implant delivery system as described in the paragraph immediately above may optionally include that the rotatable dial may include internal screw threads. The rotary to linear motion mechanism may include a lead screw with external screw threads in engagement with the internal screw threads of the rotatable dial in a manner so as to translate linearly along the longitudinal axis of the control handle as the rotatable dial is rotated about the longitudinal axis of the control handle. The second end portion of the tensioning rod may be coupled to the lead screw such that the tensioning rod may be translatable linearly together with the lead screw.

According to various embodiments, the prosthetic implant delivery system as described in the paragraph immediately above may optionally include that the control handle may include an indicator plate fixedly coupled to the lead screw and an elongated window aligned lengthwise with respect to the control handle for viewing the indicator plate as the lead screw translates linearly along the longitudinal axis of the control handle.

According to various embodiments, the prosthetic implant delivery system as described in any one of the two preceding paragraphs above may optionally include that the third control interface may include a knob to rotate a transmission shaft extending longitudinally within the control handle. A first end of the transmission shaft may be coupled to the knob and a second end of the transmission shaft may be coupled to the second end portion of the tensioning rod in a manner so as to impart a rotation of the shaft to rotate the tensioning rod about a rod axis of the tensioning rod.

According to various embodiments, the prosthetic implant delivery system as described in the paragraph immediately above may optionally include that the lead screw may be hollow with a through-channel extending longitudinally therethrough. The control handle may include a shaft coupling interconnecting the second end of the transmission shaft and the second end portion of the tensioning rod through the through-channel of the lead screw. The shaft coupling may include an elongated body having a hole extending longitudinally into the elongated body from a first end of the elongated body and a longitudinal slot along a wall of the hole. The second end of the transmission shaft may be inserted into the hole with a pin protruding perpendicularly from the second end of the transmission shaft into the longitudinal slot to form a slidable pin-slot joint. The second end portion of the tensioning rod may be fixedly coupled to a second end of the elongated body of the shaft coupling. The control handle may include a shaft-coupling-support bracket fixed to an inner wall surface of the lead screw. The shaft coupling may be fitted through the shaft-coupling-support bracket in a manner such that the shaft coupling may be rotatable about a longitudinal axis of the shaft coupling for rotating the tensioning rod about the rod axis and may be non-movable along the longitudinal axis of the shaft coupling with respect to the lead screw such that the tensioning rod may be translatable linearly together with the lead screw.

According to various embodiments, there is provided a delivery apparatus for the prosthetic implant. The delivery apparatus may include an outer sheath to compress and constrain the prosthetic implant in a first end portion of the outer sheath. The delivery apparatus may include a tensioning rod enclosed within the outer sheath. The tensioning rod may have a first end portion removably couplable to the second end of the tensioning wire of the tensioning unit of the prosthetic implant. The delivery apparatus may include a control handle at a second end portion of the outer sheath. The control handle may include a first control interface associated with the second end portion of the outer sheath and operable to retract the outer sheath for deploying the prosthetic implant. The control handle may include a second control interface associated with a second end portion of the tensioning rod and operable to retract or extend the tensioning rod with respect to the control handle for moving the second end of the tensioning wire relative to the flexible hollow tubing so as to adjust a displacement of the second end of the tensioning wire from the second end of the flexible hollow tubing to correspondingly adjust a degree of bending of the flexible hollow tubing and a degree of bending of the at least one resilient tethering strut for positioning the coaptation structure relative to the anchor member. The control handle may include a third control interface associated with a second end portion of the tensioning rod and operable to decouple the first end of the tensioning rod from the second end of the tensioning wire of the tensioning unit of the prosthetic implant.

According to various embodiments, the delivery apparatus as described in the paragraph immediately above may optionally include that, when the prosthetic implant include the spring-loaded locking pin and the lock housing, the first end portion of the tensioning rod may include a retaining element for engaging with the spring-loaded locking pin of the locking component of the prosthetic implant to hold the spring-loaded locking pin in the retracted position. The retaining element may be withdrawable to disengage from the spring-loaded pin of the locking component so as to release the spring-loaded locking pin for engaging the slider strut of the prosthetic implant.

According to various embodiments, the delivery apparatus as described in the paragraph immediately above may optionally include that the first end portion of the tensioning rod may include a coupling element for engaging with the locking component of the prosthetic implant to removably couple the first end portion of the tensioning rod to the locking component.

According to various embodiments, the delivery apparatus as described in any one of the two preceding paragraphs above may optionally include that the retaining element may include an insert tip portion. The insert tip portion may be insertable perpendicularly to the spring-loaded locking pin of the locking component of the prosthetic implant to hold the spring-loaded locking pin in the retracted position. The insert tip portion may be withdrawable to release the spring-loaded locking pin for engaging the slider strut.

According to various embodiments, the delivery apparatus as described in the paragraph immediately above may optionally include that the coupling element may include a threaded stem portion adjacent the insert tip portion. The threaded stem portion may be screwable into the lock housing of the locking component with the inset tip portion inserted perpendicularly to the spring-loaded locking pin in the retracted position. The threaded stem portion may be capable of being partially unscrewed with respect to the lock housing of the locking component to withdraw the insert tip portion from the spring-loaded locking pin so as to release the spring-loaded locking pin and fully unscrewed from the lock housing of the locking component to decouple the first end portion of the tensioning rod from the locking component.

According to various embodiments, the delivery apparatus as described in any one of the two preceding paragraphs above may optionally include that the second control interface may include a rotatable dial. The rotatable dial may be rotatable about a longitudinal axis of the control handle. The control handle may include a rotary to linear motion mechanism interconnecting the rotatable dial and the tensioning rod to convert a rotary motion of the rotatable dial to a linear translation motion of the tensioning rod.

According to various embodiments, the delivery apparatus as described in the paragraph immediately above may optionally include that the rotatable dial may include internal screw threads. The rotary to linear motion mechanism may include a lead screw with external screw threads in engagement with the internal screw threads of the rotatable dial in a manner so as to translate linearly along the longitudinal axis of the control handle as the rotatable dial is rotated about the longitudinal axis of the control handle. The second end portion of the tensioning rod may be coupled to the lead screw such that the tensioning rod may be translatable linearly together with the lead screw.

According to various embodiments, the delivery apparatus as described in the paragraph immediately above may optionally include that the control handle may include an indicator plate fixedly coupled to the lead screw and an elongated window aligned lengthwise with respect to the control handle for viewing the indicator plate as the lead screw translate linearly along the longitudinal axis of the control handle.

According to various embodiments, the delivery apparatus as described in any one of the two preceding paragraphs above may optionally include that the third control interface may include a knob to rotate a transmission shaft extending longitudinally within the control handle. A first end of the transmission shaft may be coupled to the knob and a second end of the transmission shaft may be coupled to the second end portion of the tensioning rod in a manner so as to impart a rotation of the shaft to rotate the tensioning rod about a rod axis of the tensioning rod.

According to various embodiments, the delivery apparatus as described in the paragraph immediately above may optionally include that the lead screw may be hollow with a through-channel extending longitudinally therethrough. The control handle may include a shaft coupling interconnecting the second end of the transmission shaft and the second end portion of the tensioning rod through the through-channel of the lead screw. The shaft coupling may include an elongated body having a hole extending longitudinally into the elongated body from a first end of the elongated body and a longitudinal slot along a wall of the hole. The second end of the transmission shaft may be inserted into the hole with a pin protruding perpendicularly from the second end of the transmission shaft into the longitudinal slot to form a slidable pin-slot joint. The second end portion of the tensioning rod may be fixedly coupled to a second end of the elongated body of the shaft coupling. The control handle may include a shaft-coupling-support bracket fixed to an inner wall surface of the lead screw. The shaft coupling may be fitted through the shaft-coupling-support bracket in a manner such that the shaft coupling may be rotatable about a longitudinal axis of the shaft coupling for rotating the tensioning rod about the rod axis and may be non-movable along the longitudinal axis of the shaft coupling with respect to the lead screw such that the tensioning rod may be translatable linearly together with the lead screw.

FIG. 1A shows a schematic diagram of a prosthetic implant 100 (or a prosthetic valve implant or a valve implant) according to various embodiments. According to various embodiments, the prosthetic implant 100 may include an anchor member 110. According to various embodiments, the anchor member 110 may be configured to be anchored or secured to one or more tissue sites. According to various embodiments, the anchor member 110 may include, but not limited to, a stent, a clamp, a hook, an anchoring ring, a screw, tines, or barbs.

According to various embodiments, prosthetic implant 100 may include at least one resilient tethering strut 120 extending from the anchor member 110. Accordingly, one or more resilient tethering strut 120 may be protruding from the anchor member 110 so as to stretch or reach beyond the anchor member 110. According to various embodiments, the at least one resilient tethering strut 120 may be an elongate structural member of a length of material used as a support. Accordingly, the at least one resilient tethering strut 120 may be in the form of a strip, or a stripe, or a bar, or a beam, or a stick, or a spoke, or a pole, or a spar, or a rod, of resilient material. According to various embodiments, the at least one resilient tethering strut 120 may be straight and may have a natural tendency to return to being straight after being bent or flexed. According to various embodiments, the at least one resilient tethering strut 120 may be integral with the anchor member 110. Accordingly, the at least one resilient tethering strut 120 may be integrally molded, integrally printed, integrally casted, or integrally formed with the anchor member 110 as a single unitary piece. According to various embodiments, the at least one resilient tethering strut 120 and the anchor member 110 may be separate pieces coupled, or joined, or attached, or fixed, or mated, or bonded together.

According to various embodiments, the prosthetic implant 100 may include a coaptation structure 130. According to various embodiments, the coaptation structure 130 may be configured to coapt with at least one native valve leaflet and/or to provide a surface on which at least one native valve leaflet may coapt against. According to various embodiments, the coaptation structure 130 may include, but not limited to, a valve leaflet prosthesis, a neo-leaflet, a flap, a membrane, a balloon, an occluding member, or a blocker. According to various embodiments, the coaptation structure 130 may be coupled to an end 120a of the at least one resilient tethering strut 120 away from the anchor member 110. Accordingly, the at least one resilient tethering strut 120 may be interconnecting the anchor member 110 and the coaptation structure 130 such that the anchor member 110 may be at one end 120b of the at least one resilient tethering strut 120 and the coaptation structure 130 may be at an opposite end 120a of the at least one resilient tethering strut 120. Hence, the anchor member 110 and the coaptation structure 130 may respectively be at two ends 120b, 120a of the at least one resilient tethering strut 120.

According to various embodiments, bending or flexing the at least one resilient tethering strut 120 may move the coaptation structure 130 relative to the anchor member 110 so as to vary, or adjust, or change or alter a position and/or orientation and/or disposition of the coaptation structure 130 with respect to the anchor member 110. According to various embodiments, the at least one resilient tethering strut 120 may limit a range of relative movement between the coaptation structure 130 and the anchor member 110.

According to various embodiments, the prosthetic implant 100 may include a tensioning unit 140. According to various embodiments, the tensioning unit 140 may be extending between the anchor member 110 and the coaptation structure 130. Accordingly, the anchor member 110 may be at one end of the tensioning unit 140 and the coaptation structure 130 may be at an opposite end of the tensioning unit 140. Hence, the anchor member 110 and the coaptation structure 130 may respectively be at two ends of the tensioning unit 140.

According to various embodiments, by applying a pulling force or a tensioning force to the tensioning unit 140, the tensioning unit 140 may be bent so as to corresponding bend the at least one resilient tethering strut 120 to move the coaptation structure 130 relative to the anchor member 110 for positioning and/or orienting the coaptation structure 130 with respect to the anchor member 110. According to various embodiments, the at least one resilient tethering strut 120 and the tensioning unit 140 may serve as an antagonistic pair for moving the coaptation structure 130 with respect to the anchor member 110. Accordingly, the tensioning unit 140 may be bent via an application of the pulling force or the tensioning force to move the coaptation structure 130 with respect to the anchor member 110 and, upon relieving part or all of the pulling force or the tensioning force to the tensioning unit 140, the at least one resilient tethering strut 120 may respectively provide a countering force to partially or fully reverse the movement or to partially or fully return the coaptation structure 130 to an initial position and/or orientation.

According to various embodiments, the tensioning unit 140 may include a flexible hollow tubing 142. According to various embodiments, the flexible hollow tubing 142 may be extending between the anchor member 110 and the coaptation structure 130. Thus, the flexible hollow tubing 142 may be stretching from the anchor member 110 to the coaptation structure 130. Accordingly, the anchor member 110 may be at one end 142b of the flexible hollow tubing 142 and the coaptation structure 130 may be at an opposite end 142a of the flexible hollow tubing 142. Hence, the anchor member 110 and the coaptation structure 130 may respectively be at two ends 142b, 142a of the flexible hollow tubing 142.

According to various embodiments, the tensioning unit 140 may include a tensioning wire 144. According to various embodiments, the tensioning wire 144 may be extending through the flexible hollow tubing 142. Accordingly, the flexible hollow tubing 142 may serve as a trunking or a conduit or a duct between the anchor member 110 and the coaptation structure 130 for the tensioning wire 144 to be running through or stretching within the flexible hollow tubing 142. Hence, a length of the tensioning wire 144 may be surrounded or enclosed by the flexible hollow tubing 142.

According to various embodiments, a first end 144a of the tensioning wire 144 may be fixed at a junction 132 between the first end 142a of the flexible hollow tubing 142 and the coaptation structure 130. Accordingly, the first end 144a of the tensioning wire 144 may be firmly attached or fastened to a point or a node whereby the first end 142a of the flexible hollow tubing 142 and the coaptation structure 130 meet or converge or come together. Hence, the first end 144a of the tensioning wire 144 may be in a fixed disposition with respect to the first end 142a of the flexible hollow tubing 142. According to various embodiments, the tensioning wire 144 may be threaded through or passed through or inserted through the flexible hollow tubing 142 so as to fix the first end 144a of the tensioning wire 144 at the junction 132 between the first end 142a of the flexible hollow tubing 142 and the coaptation structure 130.

According to various embodiments, a second end 144b of the tensioning wire 144 may be extending out from the second end 142b of the flexible hollow tubing 142. Accordingly, the tensioning wire 144 may be longer than the flexible hollow tubing 142 such that a segment of the tensioning wire 144 towards the second end 144b of the tensioning wire 144 may stretch outside of the flexible hollow tubing 142 and beyond the second end 142b of the flexible hollow tubing 142. Hence, the second end 144b of the tensioning wire 144 may protrude from the second end 142b of the flexible hollow tubing 142 by an extent equivalent to an additional length of the tensioning wire 144 with respect to the flexible hollow tubing 142. According to various embodiments, the second end 144b of the tensioning wire 144 may be alongside the anchor member 110.

Figure 1B:
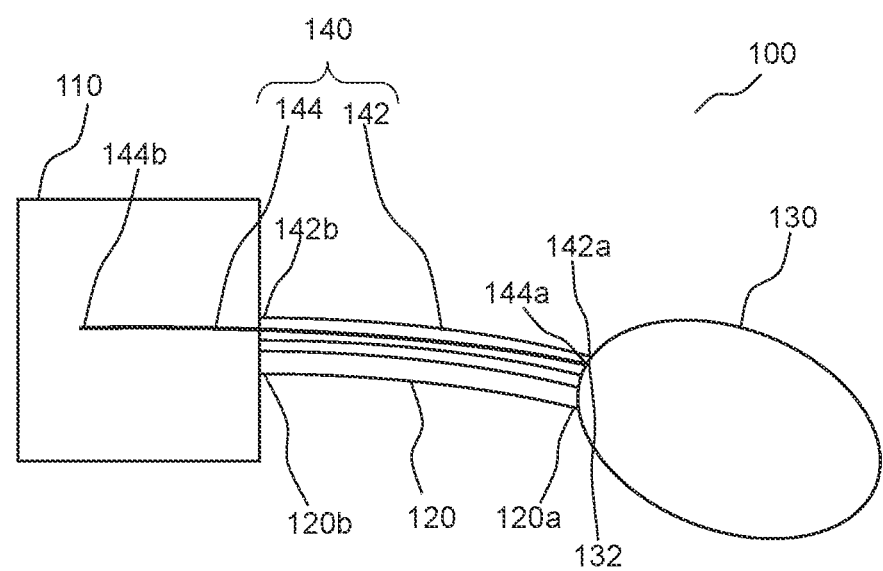
FIG. 1B shows a schematic diagram of the prosthetic implant of FIG. 1A with a coaptation structure moved relative to an anchor member according to various embodiments.

FIG. 1B shows a schematic diagram of the prosthetic implant. 100 of FIG. 1A with the coaptation structure 130 moved relative to the anchor member 110 according to various embodiments. According to various embodiments, the second end 144b of the tensioning wire 144 may be drawable relative to the flexible hollow tubing 142 to be pulled away from the second end 142b of the flexible hollow tubing 142 to bend the flexible hollow tubing 142 in a manner so as to corresponding bend the at least one resilient tethering strut 120 to move the coaptation structure 130 relative to the anchor member 110. Accordingly, the second end 144b of the tensioning wire 144 may be capable of being pulled in a direction away from the second end 142b of the flexible hollow tubing 142. Hence, the pulling force or the tensioning force may be applied to the second end 144b of the tensioning wire 144 to generate a tension along the tensioning wire. 144. Since the first end 144a of the tensioning wire 144 is fixed, the tension in the tensioning wire 144 may cause the flexible hollow tubing 142 to bend or flex. The bending or flexing of the flexible hollow tubing 142 may correspondingly cause the at least one resilient tethering strut 120 to bend or flex. With the flexible hollow tubing 142 and the at least one resilient tethering strut 120 being bent or flexed, the coaptation structure 130 which is at the second end 142b of the flexible hollow tubing 142 and the end 120b of the at least one resilient tethering strut 120 may be moved relative to the anchor member 110.

According to various embodiments, when the pulling force or the tensioning force is relieved partially or fully, the tension in the tensioning wire 144 may respectively be reduced or released. Accordingly, the at least one resilient tethering strut 120 may provide a countering force to partially or fully reverse the bending or flexing of the at least one resilient tethering strut 120 so as to partially or fully return to being straight. The unbending or unflexing of the at least one resilient tethering strut 120 may also unbend or unflex the flexible hollow tubing 142. With the flexible hollow tubing 142 and the at least one resilient tethering strut 120 being unbent or unflexed, the coaptation structure 130 which is at the second end 142b of the flexible hollow tubing 142 and the end 120b of the at least one resilient tethering strut 120 may be partially or fully return the initial position and/or orientation.

According to various embodiments, the flexible hollow tubing 142 may include, but not limited to, a slotted tubing, a ribbed tubing, a corrugated bellows tubing, an interlock tubing, a mesh tubing or a braided tubing. Accordingly, the flexible hollow tubing 142 may have the required flexibility such that application of the pulling force or the tensioning force to the tensioning wire 144 may cause the flexible hollow tubing 142 to bend or flex.

According to various embodiments, the flexible hollow tubing 142 may have directional flexibility. Accordingly, the flexible hollow tubing 142 may be flexible in a particular direction. According to various embodiments, the flexible hollow tubing 142 may be flexible in a predetermined direction such that application of the pulling force or the tensioning force to the tensioning wire 144 may cause the flexible hollow tubing 142 to always bend or flex in the predetermined direction.

According to various embodiments, the flexible hollow tubing 142 may include a first sector (for example see 242*c* in FIG. 4) extending continuously from the first end 142*a* of the flexible hollow tubing 142 to the second end 142*b* of the flexible hollow tubing 142 to form a spine portion. Accordingly, a first longitudinal wall portion of the flexible hollow tubing 142 along the first sector may be continuous without interruption so as to form a continuous longitudinal wall extending from the first end 142*a* of the flexible hollow tubing 142 to the second end 142*b* of the flexible hollow tubing 142. The continuous longitudinal wall may serve as a backbone or a spine of the flexible hollow tubing 142.

According to various embodiments, the flexible hollow tubing 142 may include a second sector (for example see 242*d* in FIG. 4) with a plurality of spaced ribs lined at regular intervals from the first end 142*a* of the flexible hollow tubing 142 to the second end 142*b* of the flexible hollow tubing 142 to form a spaced ribbed portion. Accordingly, a second longitudinal wall portion of the flexible hollow tubing 142 along the second sector may be made up of the plurality of spaced ribs, whereby each rib may be transversely oriented with respect to the flexible hollow tubing 142 and the plurality of spaced ribs may be parallel to each other. Hence, each rib may resemble a C-shaped link with the two ends respectively joined or affixed or attached or connected to two longitudinal sides of the first sector of the flexible hollow tubing 142 with the continuous longitudinal wall.

According to various embodiments, the flexible hollow tubing 142 with the continuous longitudinal wall along the first sector and the plurality of spaced ribs along the second sector may exhibit directional flexibility. According to various embodiments, when the pulling force or the tensioning force is applied to the tensioning wire 144, the plurality of spaced ribs along the second sector may collapse towards each other causing the continuous longitudinal wall along the first sector to bend or flex towards the second sector. Accordingly, the flexible hollow tubing 142 may always bend towards the second sector with the plurality of spaced ribs.

According to various embodiments, the plurality of spaced ribs of the flexible hollow tubing 142 may be formed by a plurality of parallel transverse cuts or slots along the second sector of the flexible hollow tubing 142. Accordingly, the remaining uncut transverse portions may form the plurality of spaced ribs with empty space or gap therebetween. Hence, when the pulling force or the tensioning force is applied to the tensioning wire 144, the uncut transverse portions forming the plurality of spaced ribs may collapse together.

According to various embodiments, the plurality of spaced ribs of the flexible hollow tubing 142 may be formed by a series of corrugated bellows, with alternating crest portions and root potions, along the second sector of the flexible hollow tubing 142. Accordingly, the crest portions of the corrugated bellows may form the plurality of spaced ribs. Hence, when the pulling force or the tensioning force is applied to the tensioning wire 144, the root portions may be folded such that the crest portions may collapse together.

According to various embodiments, the plurality of spaced ribs of the flexible hollow tubing 142 may be formed by alternating transverse strips of thicker materials and transverse strips of thinner materials. The transverse strips of thinner materials may be in the form of thin sheets or film or membrane. Accordingly, the transverse strips of thicker materials may form the plurality of spaced ribs. Hence, when the pulling force or the tensioning force is applied to the tensioning wire 144, the transverse strips of thinner materials may be folded such that the transvers strips of thicker materials may collapse together.

According to various embodiments, the flexible hollow tubing 142 may be formed by a series of interlocking rings. An axial width of a first sector of each ring may be larger than an axial width of a second sector of each ring. Accordingly, the series of interlocking rings may be interlocked or interconnected along the first sectors of the series of rings to form the flexible hollow tubing 142. Hence, the first sector of the flexible hollow tubing 142 may be made up of the first sectors of the series of interlocking rings interlocked or interconnected in a continuous manner. The second sectors of the series of interlocking rings may then be spaced from each other with gaps or empty spaces therebetween along the second sector of the flexible hollow tubing 142. Thus, the plurality of spaced ribs of the flexible hollow tubing 142 may be formed by the second sectors of the series of interlocking rings. When the pulling force or the tensioning force is applied to the tensioning wire 144, the second sectors of the series of interlocking rings may collapse together.

Referring to FIG. 2 through FIG. 8D, there is illustrated therein a prosthetic valve implant 200 (or a valve implant or a tricuspid implant) as an example of the prosthetic implant 100 of FIG. 1A and FIG. 1B and a delivery apparatus 260 (or delivery system handle). According to various embodiments, the prosthetic valve implant 200 may include all the features and limitations of the prosthetic implant 100 of FIG. 1A and FIG. 1B and is described in the following with similar reference characters referring to the same/common parts throughout. Further details of the prosthetic valve implant 200 as shown are also described in the following.

According to various embodiments, when the prosthetic valve implant 200 may be used for replacing a diseased valve within a heart. According to various embodiments, the delivery apparatus 260 may be used to percutaneously deliver the prosthetic valve implant 200 into the heart for replacing the diseased valve.

Various embodiments are related to the aspects and/or ability of the prosthetic valve implant 200 to be positioned within a Tricuspid Valve (TV) of a heart in the treatment of Tricuspid Regurgitation (TR) via a tensioning system. The tensioning system may include a tensioning unit 240 (or a tensioner) of the prosthetic valve implant 200 and a tensioning mechanism 261 of the delivery apparatus 260.

Figure 2:
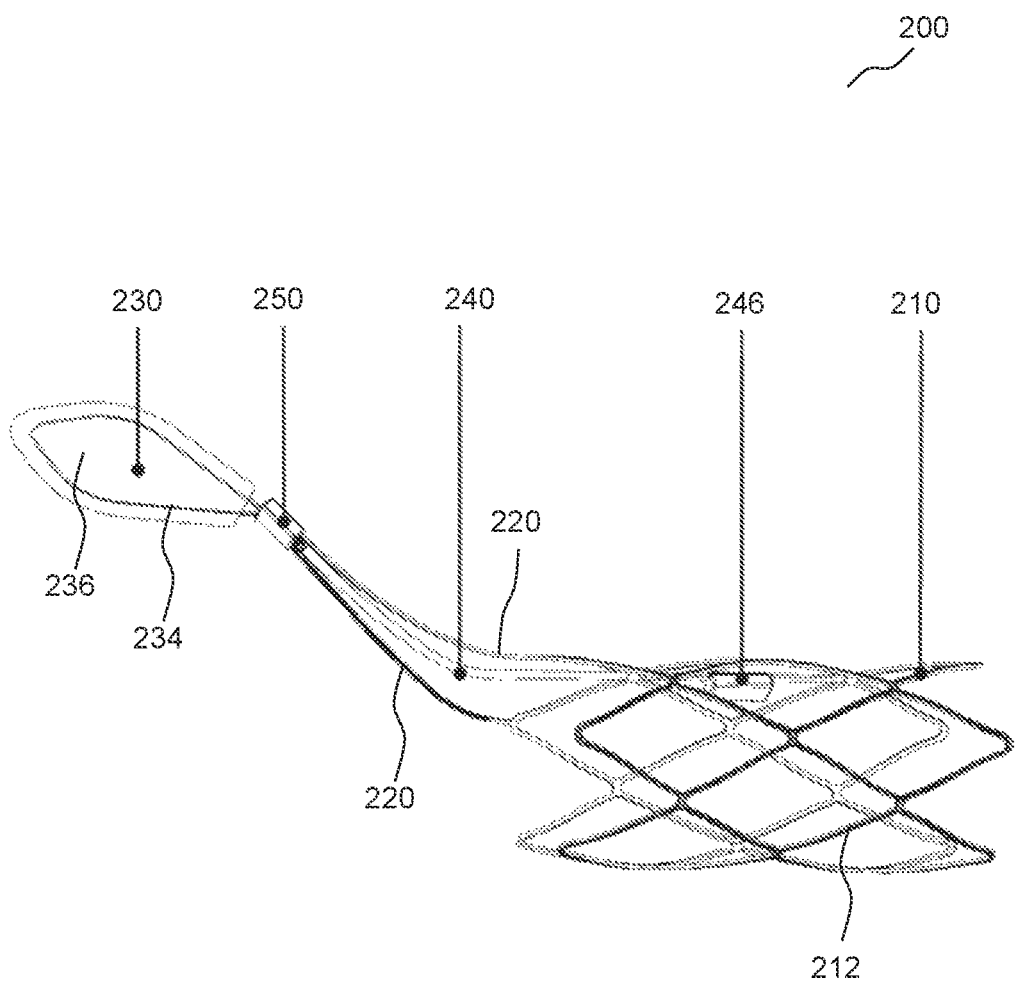
FIG. 2 shows a prosthetic valve implant as an example of the prosthetic implant of FIG. 1A according to various embodiments.

FIG. 2 shows the prosthetic valve implant 200 according to various embodiments. According to various embodiments, the prosthetic valve implant 200 may include a stent 210 serving as an anchor member of the prosthetic valve implant 200, similar to the anchor member 110 of the prosthetic implant 100 of FIG. 1A and FIG. 1B. According to various embodiments, the stent 210 may be an Inferior Vena Cava (IVC) Stent. According to various embodiments, the stent 210 may be made from nitinol. When the prosthetic valve implant 200 is deployed in the heart, the stent 210 may be positioned in the IVC, near the juncture of the right Atrium (RA) and IVC. Accordingly, the stent 210 may anchor or secure the prosthetic valve implant 200 in the IVC.

According to various embodiments, the prosthetic valve implant 200 may include a valve leaflet prosthesis 230 (or a neo-leaflet or a sail) serving as a coaptation structure of the prosthetic valve implant 200, similar to the coaptation structure 130 of the prosthetic implant 100 of FIG. 1A and FIG. 1B. According to various embodiments, the valve leaflet prosthesis 230 may include a support frame 234 (or leaflet frame or sail frame) and a leaflet blade panel 236 (or fabric or fabric panel) covering or supported by or attached to or secured to the support frame 234 so as to form a prosthetic leaflet or a sail. For example, the support frame 234 of the valve leaflet prosthesis 230 may be a nitinol frame and the leaflet blade panel 236 may be a medical grade surgical fabric sewn over or attached to or secured to the support frame 234. Further, polyester sutures may be used to attach the leaflet blade panel 236 to the support frame 234 (or the nitinol frame). According to various embodiments, the valve leaflet prosthesis 230 may be connected to the stent 210. For example, the support frame 234 of the valve leaflet prosthesis 230 may be permanently attached to the stent 210. When the prosthetic valve implant 200 is deployed in the heart with the stent 210 in the IVC, the valve leaflet prosthesis 230 with the leaflet blade panel 236 covering the support frame 234 (or the fabric covering the sail frame) may extends into the Tricuspid Valve (TV) to serve as a coaptation structure for the native TV leaflets.

According to various embodiments, the prosthetic valve implant 200 may include a coupler 250 that connects the stent 210 and the valve leaflet prosthesis 230. According to various embodiments, the coupler 250 may be configured to allow limited multi-rotational movement of the valve leaflet prosthesis 230 with respect to the coupler 250 so as to enable blood "in-flow" into the right ventricle from the right atrium and resists "out-flow" (regurgitation) from the TV.

According to various embodiments, the prosthetic valve implant 200 may include the tensioning unit 240 (or a tensioner). The tensioning unit 240 may be an adjustable component that upon tightening of an internal structure may move the coupler 250 towards the TV to aid in positioning the valve leaflet prosthesis 230 within the native TV annulus. A locking component 246 (or a tension anchor) of the tensioning unit 240 may be connected to the coupler 250 and may slide along a strut of the stent 210. Movement of the locking component 246 of the tensioning unit 240 may be controlled with the tensioning mechanism 261 inside the delivery apparatus 260. The locking component 246 of the tensioning unit 240 may be securely locked into position on the stent 210 during the implantation procedure and the tensioning mechanism 261 of the delivery apparatus 260 may be disconnected to complete delivery of the prosthetic valve implant 200.

Figure 3A:
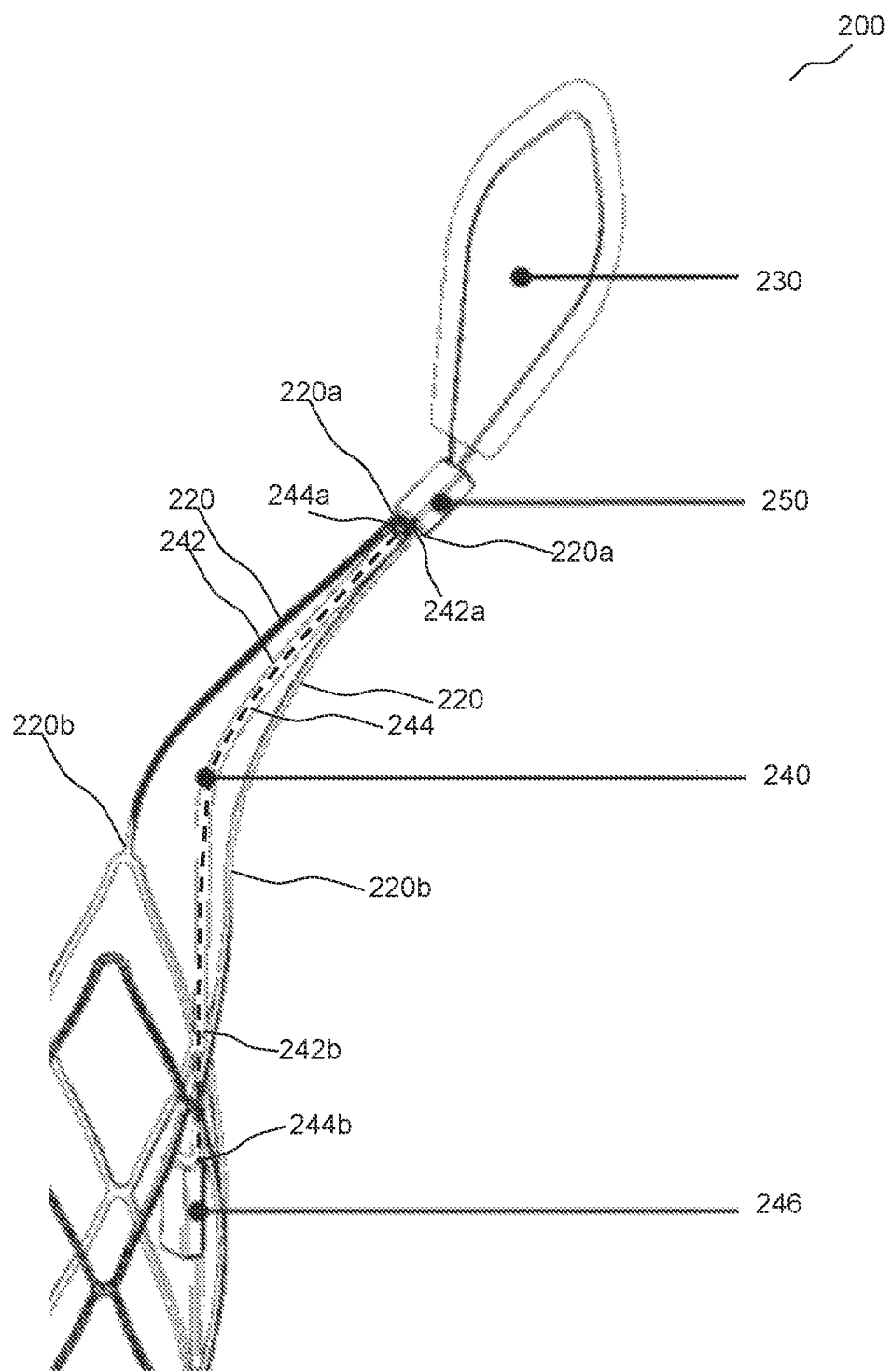
FIG. 3A shows the prosthetic valve implant of FIG. 2 zoomed in to a tensioning unit according to various embodiments.

FIG. 3A shows the prosthetic valve implant 200 zoomed in to the tensioning unit 240 according to various embodiments. FIG. 3B and FIG. 3C show an example of the tensioning unit 240 according to various embodiments. According to various embodiments, the tensioning unit serve to provide a means for positioning the valve leaflet prosthesis 230 in the TV to promote coaptation of the valve leaflet prosthesis 230 with the native TV leaflets and ultimately reduce TR. According to various embodiments, the tensioning unit 240 may include a flexible hollow tubing 242 and a tensioning wire 244. According to various embodiments, the flexible hollow tubing 242 may be made of metal or plastic. According to various embodiments, the tensioning wire 244 may be a tension wire or suture. According to various embodiments, the tensioning wire 244 may be positioned inside the flexible hollow tubing 242. According to various embodiments, the tensioning wire 244 may connects the coupler 250 to the locking component 246 of the tensioning unit 240. According to various embodiments, the flexible hollow tubing 242 may have a laser cut pattern (see FIG. 3B) in the tubing wall that allows it to preferentially flex when the locking component 246 of the tensioning unit 240 is pulled along the axis of the stent 210. This tensioning action may flex or bend the flexible hollow tubing 242 and repositions the valve leaflet prosthesis 230 from the right atrium of the heart towards and into the TV. According to various embodiments, the tensioning wire 244 may be enclosed in a polytetrafluoroethylene (PTFE) tube to reduce frictional forces and improve the valve leaflet prosthesis 230 repositioning response time.

FIG. 4 shows three tensioning units 240 with varying amount of curvature according to various embodiments. According to various embodiments, depending upon the amount of tension applied to the tensioning wire 244, varying amounts of curvature may be possible.

According to various embodiments, the prosthetic valve implant 200 may include at least one resilient tethering strut 220 extending from the stent 210. Accordingly, one or more resilient tethering strut 220 may be protruding from the stent 210 so as to stretch or reach beyond the stent 210. According to various embodiments, the stent 210 may be of a cylindrical shape and may be formed by a plurality of stent struts 212. According to various embodiments, the at least one resilient tethering strut 220 may be extending from a longitudinal end of the stent 210. According to various embodiments, the at least one resilient tethering strut 220 may be an elongate structural member of a length of material used as a support. Accordingly, the at least one resilient tethering strut 220 may be in the form of a strip, or a stripe, or a bar, or a beam, or a stick, or a spoke, or a pole, or a spar, or a rod, of resilient material. According to various embodiments, the at least one resilient tethering strut 220 may be straight and may have a natural tendency to return to being straight after being bent or flexed. According to various embodiments, the at least one resilient tethering strut 220 may be integral with the stent 210. For example, the at least one resilient tethering strut 220 may be one of the stent struts 212 of the stent 210 that is extended from the stent 210. Accordingly, the at least one resilient tethering strut 220 may be integrally molded, integrally printed, integrally casted, or integrally formed with the stent 210 as a single unitary piece. According to various embodiments, the prosthetic valve implant 200 may include two resilient tethering struts 220 extending from the stent 210.

According to various embodiments, the valve leaflet prosthesis 230 of the prosthetic valve implant 200 may be coupled to an end 220a of the at least one resilient tethering strut 220 (or each of the two resilient tethering struts 220) away from the stent 210. According to various embodiments, the end 220a of the at least one resilient tethering strut 220 (or each of the two resilient tethering struts 220) may be coupled to the valve leaflet prosthesis 230 via the coupler 250. Accordingly, the at least one resilient tethering strut 220 (or the two resilient tethering struts 220) may be interconnecting the stent 210 and the valve leaflet prosthesis 230 such that the stent 210 may be at one end 220b of the at least one resilient tethering strut 220 (or each of the two resilient tethering struts 220) and the valve leaflet prosthesis 230 may be at an opposite end 220a of the at least one resilient tethering strut 220 (or each of the two resilient tethering struts 220). Hence, the stent 210 and the valve leaflet prosthesis 230 may respectively be at two ends 220b, 220a of the at least one resilient tethering strut 220 (or each of the two resilient tethering struts 220).

According to various embodiments, bending or flexing the at least one resilient tethering strut 220 (or the two resilient tethering struts 220) may move the valve leaflet prosthesis 230 relative to the stent 210 so as to vary, or adjust, or change or alter a position and/or orientation and/or disposition of the valve leaflet prosthesis 230 with respect to the stent 210. According to various embodiments, the at least one resilient tethering strut 120. (or the two resilient tethering struts 220) may limit a range of relative movement between the valve leaflet prosthesis 230 and the stent 210.

According to various embodiments, the tensioning unit 240 of the prosthetic valve implant 200 may be extending between the stent 210 and the valve leaflet prosthesis 230. Accordingly, the stent 210 may be at one end of the tensioning unit 240 and the valve leaflet prosthesis 230 may be at an opposite end of the tensioning unit 240. Hence, the stent 210 and the valve leaflet prosthesis 230 may respectively be at two ends of the tensioning unit 240.

According to various embodiments, by applying a pulling force or a tensioning force to the tensioning unit 240, the tensioning unit 240 may be bent so as to correspondingly bend the at least one resilient tethering strut 220 (or the two resilient tethering struts 220) to move the valve leaflet prosthesis 230 relative to the stent 210 for positioning and/or orienting the valve leaflet prosthesis 230 with respect to the stent 210. According to various embodiments, the at least one resilient tethering strut 220 (or the two resilient tethering struts 220) and the tensioning unit 240 may serve as an antagonistic pair for moving the valve leaflet prosthesis 230 with respect to the stent 210. Accordingly, the tensioning unit 240 may be bent via an application of the pulling force or the tensioning force to move the valve leaflet prosthesis 230 with respect to the stent 210 and, upon relieving part or all of the pulling force or the tensioning force to the tensioning unit 240, the at least one resilient tethering strut 120 (or the two resilient tethering struts 220) may respectively provide a countering force to partially or fully reverse the movement or to partially or fully return the valve leaflet prosthesis 230 to an initial position and/or orientation.

According to various, embodiments, the flexible hollow tubing 242 of the tensioning unit 240 of the prosthetic valve implant 200 may be extending between the stent 210 and the valve leaflet prosthesis 230. Thus, the flexible hollow tubing 242 may be stretching from the stent 210 to the valve leaflet prosthesis 230. Accordingly, the stent 210 may be at one end 242b of the flexible hollow tubing 242 and the valve leaflet prosthesis 230 may be at an opposite end 242a of the flexible hollow tubing 242. Hence, the stent 210 and the valve leaflet prosthesis 230 may respectively be at two ends 242b, 242a of the flexible hollow tubing 242. According to various embodiments, the end 242b of the flexible hollow tubing 242 may be coupled to the stent 210. According to various embodiments, the end 242a of the flexible hollow tubing 242 may be connected to the prosthetic valve implant 200 via the coupler 250.

According to various embodiments, the tensioning wire 244 of the tensioning unit 240 of the prosthetic valve implant 200 may be extending through the flexible hollow tubing 242. Accordingly, the flexible hollow tubing 242 may serve as a trunking or a conduit or a duct between the stent 210 and the valve leaflet prosthesis 230 for the tensioning wire 244 to be running through or stretching within the flexible hollow tubing 242. Hence, a length of the tensioning wire 244 may be surrounded or enclosed by the flexible hollow tubing 242.

According to various embodiments, a first end 244a of the tensioning wire 244 may be fixed at a junction between the first end 242a of the flexible hollow tubing 242 and the valve leaflet prosthesis 230. Accordingly, the first end 244a of the tensioning wire 244 may be firmly attached or fastened to a point or a node whereby the first end 242a of the flexible hollow tubing 242 and the valve leaflet prosthesis 230 meet or converge or come together. Hence, the first end 244a of the tensioning wire 244 may be in a fixed disposition with respect to the first end 242a of the flexible hollow tubing 242. According to various. embodiments, the junction between the first end 242a of the flexible hollow tubing 242 and the valve leaflet prosthesis 230 may be the coupler 250. According to various embodiments, the tensioning wire 244 may be threaded through or passed through or inserted through the flexible hollow tubing 242 so as to fix the first end 244a of the tensioning wire 244 with respect to the coupler 250 between the first end 242a of the flexible hollow tubing 242 and the valve leaflet prosthesis 230. Accordingly, the first end 244a of the tensioning wire 244 may be fixed to the coupler 250, or to the first end 242a of the flexible hollow tubing 242 connected to the coupler 250, or to the end 220a of the at least one resilient tethering strut 220 (or each of the two resilient tethering struts 220) connected to the coupler 250, or to a portion of the valve leaflet prosthesis 230 connected to the coupler 250.

According to various embodiments, a second end 244b of the tensioning wire 244 may be extending out from the second end 242b of the flexible hollow tubing 242. Accordingly, the tensioning wire 244 may be longer than the flexible hollow tubing 242 such that a segment of the tensioning wire 244 towards the second end 244b of the tensioning wire 244 may stretch outside of the flexible hollow tubing 242 and beyond the second end 242b of the flexible hollow tubing 242. Hence, the second end 244b of the tensioning wire 244 may protrude from the second end 242b of the flexible hollow tubing 242 by an extent equivalent to an additional length of the tensioning wire 244 with respect to the flexible hollow tubing 242. According to various embodiments, the second end 244b of the tensioning wire 244 may be alongside the stent 210: According to various embodiments, the second end 244b of the tensioning wire 244 may be coupled to the locking component 246 of the tensioning unit 240. According to various embodiments, the locking component 246 of the tensioning unit 240 may be along the stent 210.

According to various embodiments, the second end 244b of the tensioning wire 244 (or the locking component 246) may be drawable relative to the flexible hollow tubing 242 to be pulled away from the second end 242b of the flexible hollow tubing 242 to bend the flexible hollow tubing 242 in a manner so as to correspondingly bend the at least one resilient tethering strut 220 (or the two resilient tethering struts 220) to move the valve leaflet prosthesis 230 relative to the stent 210. Accordingly, the second end 244b of the tensioning wire 244 (or the locking component 246) may be capable of being pulled in a direction away from the second end 242b of the flexible hollow tubing 242. Hence, the pulling force or the tensioning force may be applied to the second end 244b of the tensioning wire 244 (or the locking component 246) to generate a tension along the tensioning wire 244. Since the first end 244a of the tensioning wire 244 is fixed with respect to the coupler 250, the tension in the tensioning wire 244 may cause the flexible hollow tubing 242 to bend or flex. The bending or flexing of the flexible hollow tubing 242 may correspondingly cause the at least one resilient tethering strut 220 (or the two resilient tethering struts 220) to bend or flex. With the flexible hollow tubing 242 and the at least one resilient tethering strut 220 (or the two resilient tethering struts 220) being bent or flexed, the valve leaflet prosthesis 230 which is connected to the second end 242b of the flexible hollow tubing 242 and the end 220b of the at least one resilient tethering strut 220 (or each of the two resilient tethering struts 220) via the coupler 250 may be moved relative to the stent 210.

According to various embodiments, when the pulling force or the tensioning force is relieved partially or fully, the tension in the tensioning wire 244 may respectively be reduced or released. Accordingly, the at least one resilient tethering strut 220 (or the two resilient tethering struts 220) may provide a countering force to partially or fully reverse the bending or flexing of the at least one resilient tethering strut 220 (or the two resilient tethering struts 220) so as to partially or fully return to being straight. The unbending or unflexing of the at least one resilient tethering strut 220 (or the two resilient tethering struts 220) may also unbend or unflex the flexible hollow tubing 242. With the flexible hollow tubing 242 and the at least one resilient tethering strut 220 (or the two resilient tethering struts 220) being unbent or unflexed, the valve leaflet prosthesis 230 which connected to the second end 242b of the flexible hollow tubing 242 and the end 220b of the at least one resilient tethering strut 220 via the coupler 250 may be partially or fully return the initial position and/or orientation. According to various embodiments, relieving or releasing of the pulling force or the tensioning force may be required to either reposition or retrieve the prosthetic valve implant 200. Accordingly, with the at least one resilient tethering strut 220 (or the two resilient tethering struts 220) providing the countering force, reposition and/or retrieval of the prosthetic valve implant 200 may be enabled.

According to various embodiments, the flexible hollow tubing 242 may be a slotted tubing or a ribbed tubing, as illustrated, so as to provide the required flexibility such that application of the pulling force or the tensioning force to the tensioning wire 244 may cause the flexible hollow tubing 242 to bend or flex.

According to various embodiments, the flexible hollow tubing 242 may have directional flexibility. Accordingly, the flexible hollow tubing 242 may be flexible in a particular direction. According to various embodiments, the flexible hollow tubing 242 may be flexible in a predetermined direction such that application of the pulling force or the tensioning force to the tensioning wire 244 may cause the flexible hollow tubing 242 to always bend or flex in the predetermined direction.

According to various embodiments, the flexible hollow tubing 242 may include a first sector 242c extending continuously from the first end 242a of the flexible hollow tubing 242 to the second end 242b of the flexible hollow tubing 242 to form a spine portion. Accordingly, a first longitudinal wall portion of the flexible hollow tubing 242 along the first sector 242c may be continuous without interruption so as to form a continuous longitudinal wall extending from the first end 242a of the flexible hollow tubing 242 to the second end 242b of the flexible hollow tubing 242. The continuous longitudinal wall may serve as a backbone or a spine of the flexible hollow tubing 242.

According to various embodiments, the flexible hollow tubing 242 may include a second sector 242d with a plurality of spaced ribs 242e lined at regular intervals from the first end 242a of the flexible hollow tubing 242 to the second end 242b of the flexible hollow tubing 242 to form a spaced ribbed portion. Accordingly, a second longitudinal wall portion of the flexible hollow tubing 242 along the second sector may be made up of the plurality of spaced ribs 242e, whereby each rib 242e may be transversely oriented with respect to the flexible hollow tubing 242 and the plurality of spaced ribs 242e may be parallel to each other. Hence, each rib 242e may resemble a C-shaped link with the two ends respectively joined or affixed or attached or connected to two longitudinal sides of the first sector 242c of the flexible hollow tubing 242 with the continuous longitudinal wall.

According to various embodiments, the flexible hollow tubing 242 with the continuous longitudinal wall along the first sector 242c and the plurality of spaced ribs 242e along the second sector 242d may exhibit directional flexibility. According to various embodiments, when the pulling force or the tensioning force is applied to the tensioning wire 244, the plurality of spaced ribs 242e along the second sector 242d may collapse towards each other causing the continuous longitudinal wall along the first sector 242c to bend or flex towards the second sector 242d. Accordingly, the flexible hollow tubing 242 may always bend towards the second sector 242d with the plurality of spaced ribs 242e.

According to various embodiments, the plurality of spaced ribs 242e of the flexible hollow tubing 242 may be formed by a plurality of parallel transverse cuts or slots along the second sector 242d of the flexible hollow tubing 242. Accordingly, the remaining uncut transverse portions may form the plurality of spaced ribs 242e with empty space or gap therebetween. Hence, when the pulling force or the tensioning force is applied to the tensioning wire 244, the uncut transverse portions forming the plurality of spaced ribs 242e may collapse together. According to various embodiments, each of the plurality of transverse cuts may have a V-shaped or a U-shaped cut segment 242g.

FIG. 5A shows an assembled view of the valve leaflet prosthesis 230, the coupler 250, the at least one resilient tethering strut 220 (or the two resilient tethering struts 220), and the tensioning unit 240 according to various embodiments. FIG. 5B shows a disassembled view of FIG. 5A according to various embodiments. FIG. 5C shows an enlarged view of the coupler 250 according to various embodiments. According to various embodiments, the coupler 250 may connect the stent 210 to the valve leaflet prosthesis 230 and provide a prescribed or predetermined freedom of movement of the valve leaflet prosthesis 230. Accordingly, the coupler 250 may connect the at least one resilient tethering strut 220 (or the two resilient tethering struts 220), which is extending from the stent 210, to the valve leaflet prosthesis 230.

According to various embodiments, the coupler 250 may include a locking pin 252 (or locking key or coupler pin). According to various embodiments, the end 220a of the at least one resilient tethering strut 220 may include a pin-hole 222 (or key-hole or hole). Accordingly, the locking pin 252 may be inserted through the coupler 250 into the pin-hole 222 at the end 220a of the at least one resilient tethering strut 220 when the end 220a of the at least one resilient tethering strut 220 is inserted into the coupler 250. According to various embodiments, the locking pin 252 may have an interference fit with the pin-hole 222 at the end 220a of the at least one resilient tethering strut 220. According to various embodiments, the support frame 234 of the valve leaflet prosthesis 230 may include a pair of L-shaped connection legs 236 (or angled legs). According to various embodiments, the locking pin 252 of the coupler 250 may have a spacer portion 252b which may be inserted between the pair of L-shaped connection legs 236 when the pair of L-shaped connection legs 236 of the valve leaflet prosthesis 230 is inserted into the coupler 250. Accordingly, the locking pin 252 of the coupler 250 may lock the pair of L-shaped connection legs 236 of the valve leaflet prosthesis 230 into two opposite side holes 254 of the coupler 250.

According to various embodiments, a shape or configuration of the locking pin 252 may maintain the relationship between the components, i.e. the coupler 250, the end 220a of the at least one resilient tethering strut 220 and the pair of L-shaped connection legs 236 of the valve leaflet prosthesis 230, in a manner so as to allow some freedom of movement of the valve leaflet prosthesis 230. According to various embodiments, by varying a size and/or dimension and/or position of a first opening 251a of the coupler 250 which the pair of L-shaped connection legs 236 of the valve leaflet prosthesis 230 is inserted and the side holes 254, various combinations of rotational play (torsion play) about a main axis (or a longitudinal axis) of the coupler 250 and pivoting play about a hole axis of the side holes 254 may be achieved.

According to various embodiments, the support frame 234 of the valve leaflet prosthesis 230 may be made from flat sheet cuttings or may be made of wires with round cross-section. According to various embodiments, the support frame 234 of the valve leaflet prosthesis 230 and/or the coupler 250 and/or the at least one resilient tethering strut 220 (or the two resilient tethering struts 220) and/or the tensioning unit 240 may be made of plastic material so as to prevent metal to metal contact such that corrosion and premature wear may be minimized.

According to various embodiments, the coupler 250 may couple the valve leaflet prosthesis 230 to the end 220a of the at least one resilient tethering strut 220. According to various embodiments, the coupler 250 may include a first connection end 250a to receive the valve leaflet prosthesis 230 and a second connection end 250b to receive the end 220a of the at least one resilient tethering strut 220. Accordingly, the valve leaflet prosthesis 230 may be connected or fitted to the first connection end 250a of the coupler 250 and the end 220a of the at least one resilient tethering strut 220 may be connected or fitted to the second connection end 250b of the coupler 250. According to various embodiments, the main axis of the coupler 250 may extend between the first connection end 250a and the second connection end 250b. According to various embodiments, the coupler 250 may be of an elongated shape wherein a first longitudinal end may be the first connection end 250, a second longitudinal end may be the second connection end 250b and the longitudinal axis may be the main axis of the coupler 250.

According to various embodiments, the valve leaflet prosthesis 230 may be connected or fitted to the first connection end 250a of the coupler 250 with rotational play (or torsion play) about the main axis of the coupler 250 and pivoting play about a transverse axis perpendicular to the main axis of the coupler 250. Accordingly, the valve leaflet prosthesis 230 may be connected or fitted to the first connection end 250a of the coupler 250 with some leeway for rotational and/or pivoting movement about two orthogonal axes of the coupler 250, including the main axis of the coupler 250 and the transverse axis perpendicular to the main axis of the coupler 250. Hence, the valve leaflet prosthesis 230 may have some degree of rotational and/or pivoting movement relative to the coupler 250.

According to various embodiments, the support frame 234 of the valve leaflet prosthesis 230 may include the pair of L-shaped connection legs 236 with feet 236a pointing in opposite directions away from each other. Accordingly, the pair of L-shaped connection legs 236 may be mirror image of each other with the feet 236a respectively directed outwards.

According to various embodiments, the coupler 250 may include a hollow coupler body 251. According to various embodiments, the hollow coupler body 251 may be of an elongated shape. According to various embodiments, the hollow coupler body 251 may include the first opening 251a at the first connection end 250a. The valve leaflet prosthesis 230 may be connected or fitted to the coupler 250 with the pair of L-shaped connection legs 236 inserted into the first opening 251a at the first connection end 250a. According to various embodiments, the hollow coupler body 251 may include the pair of side-holes 254 in opposite wall portions of the hollow coupler body 251. Accordingly, the pair of side-holes 254 may be aligned to each other. According to various embodiments, the pair of side-holes may be two through-holes. According to various embodiments, the pair of side-holes 254 may be coaxial with the transverse axis which is perpendicular to the main axis of the coupler 250. Accordingly, the the pair of side-holes 254 may be aligned to the transverse axis of the coupler 250.

According to various embodiments, a height of the first opening 251a in a height direction perpendicular to the main axis and the transverse axis of the coupler 250 may be larger than a thickness of the pair of L-shaped connection legs 236. The height direction of the coupler 250, the main axis of the coupler 250 and the transverse axis of the coupler 250 may be perpendicular to each other. Accordingly, with the height of the first opening 251a larger than the thickness of the pair of L-shaped connection legs 236, some degree of play may be provided between the pair of L-shaped connection legs 236 of the valve leaflet prosthesis 230 and the first opening 251a of the coupler 250.

According to various embodiments, the pair of L-shaped connection legs 236 of the valve leaflet prosthesis 230 may be inserted into the first opening 251a at the first connection end 250a of the coupler 250 with the feet 236a of the pair of L-shaped connection legs 236 respectively fitted into the pair of side-holes 254 of the coupler 250. Accordingly, the valve leaflet prosthesis 230 valve leaflet prosthesis 230 may be connected to the coupler 250 with the pair of L-shaped connection legs 236 of the valve leaflet prosthesis 230 may be inserted into the first opening 251a and the feet 236a of the pair of L-shaped connection legs 236 inserted into the pair of side-holes 254. Hence, with the height of the first opening 251a larger than the thickness of the pair of L-shaped connection legs 236, the valve leaflet prosthesis 230 may have pivoting play about the feet 236a of the pair of L-shaped connection legs 236 (or the pair of side-holes 254).

According to various embodiments, each of the pair of side-holes 254 may be a slot parallel to the height direction of the first opening 251a at the first connection end 250a of the coupler 250. Accordingly, the slot may be extending vertically with respect to a plane containing the main axis and the transverse axis of the coupler 250. With the pair of side-holes 254 being vertical slots, the valve leaflet prosthesis 230 may have rotational play (or torsion play) about the main axis of the coupler 250.

According to various embodiments, the the hollow coupler body 251 of the coupler 250 may include a second opening 251b at the second connection end 250b. The at least one resilient tethering strut may be connected or fitted to the coupler 250 with the end 220a of the at least one resilient tethering strut 220 inserted into the second opening 251a at the second connection end 250a. According to various embodiments, the hollow coupler body 251 of the coupler 250 may include a pin-hole 252a (or key-hole) in a wall portion of the hollow coupler body 251. The pin-hole 252a in the wall portion of the hollow coupler body 251 may correspond with the pin-hole 222 at the end 220a of the at least one resilient tethering strut 220, as well as correspond with the locking pin 252. Accordingly, the locking pin 252 may be inserted through the pin-hole 252a in the wall portion of the hollow coupler body 251 into the pin-hole 222 at the end 220a of the at least one resilient tethering strut 220 when the end 220a of the at least one resilient tethering strut 220 is inserted into the coupler 250. Hence, the locking pin 252 may be inserted through the corresponding pin-hole 252a of the hollow coupler body 251 of the coupler 250 and into the pin-hole 222 of the end 220a of the at least one resilient tethering strut 220 to lock the at least one resilient tethering strut 220 to the coupler 250.

According to various embodiments, the locking pin 252 may have a spacer portion 252b. According to various embodiments, the spacer portion 252b of the locking pin 252 may be inserted between the pair of L-shaped connection legs 236 of the valve leaflet prosthesis 230 to keep the pair of L-shaped connection legs apart so as to retain the feet 236a of the pair of L-shaped connection legs 236 respectively fitted into the pair of side-holes 254 of the coupler body 251 of the coupler 250. According to various embodiments, with the pair of L-shaped connection legs 236 of the valve leaflet prosthesis 230 inserted into the first opening 251a at the first connection end 250a of the hollow coupler body 251 and the end 220a of the at least one resilient tethering strut 220 inserted into the second opening 251a at the second connection end 250a, the feet 236a of the pair of L-shaped connection legs 236 may be abutting the end 220a of the at least one resilient tethering strut 220 within the hollow coupler body 251. Accordingly, when the locking pin 252 is inserted into the hollow coupler body 251, part of the locking pin 252 may be inserted into the pin-hole 222 of the end 220a of the at least one resilient tethering strut 220 and the spacer portion 252b of the locking pin 252 may be inserted between the pair of L-shaped connection legs 236 of the valve leaflet prosthesis 230.

According to various embodiments, the first end 242a of the flexible hollow tubing 242 of the tensioning unit 240 may be coupled to the end 220a of the at least one resilient tethering strut 220. According to various embodiments, the flexible hollow tubing 242 may be running alongside the at least one resilient tethering strut 220 from the end 220a of the at least one resilient tethering strut 220 to the stent 210. According to various embodiments, the second end 242b of the flexible hollow tubing 242 of the tensioning unit 240 may be coupled to the stent 210. According to various embodiments, the first end 244a of the tensioning wire 244 of the tensioning unit 240 may be fixed to the end 220a of the at least one resilient tethering strut 220. According to various embodiments, the first end 244a of the tensioning wire 244 of the tensioning unit 240 may be fixed by various fastening method including, but not limited to, knotting, tying, bonding, or welding.

Figure 6A:
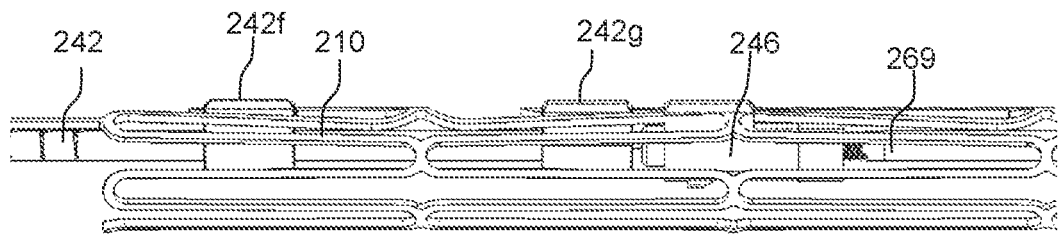
FIG. 6A shows a zoomed in view of a connection between the tensioning unit and the stent of the prosthetic valve implant of FIG. 2 according to various embodiments.

FIG. 6A shows a zoomed in view of a connection between flexible hollow tubing 242 of the tensioning unit 240 and the stent 210 of the prosthetic valve implant 200 of FIG. 2 according to various embodiments. FIG. 6B to FIG. 6E show cross-sectional view of FIG. 6A illustrating different stages of operations of the locking component 246 of the tensioning unit 240 according to various embodiments. FIG. 6F shows a perspective view of the stent 210 according to various embodiments. FIG. 6G shows a cut view of the stent 210 of FIG. 6F to illustrate the locking component 246 according to various embodiments. According to various embodiments, the locking component 246 of the tensioning unit 250 serve to lock onto the Stent 210 and maintain the amount of tension in the tensioning wire 244 after the valve leaflet prosthesis 230 is positioned and the stent 210 is completely deployed (or released). According to various embodiments, the locking component 246 and the flexible hollow tubing 242 may be mounted on the stent 210 as shown in FIG. 6A to FIG. 6E.

As shown, the flexible hollow tubing 242 may be mounted to the stent 210 via a tubing support 242f and a tubing connector 242g. As also shown, the locking component 246 may include a spring-loaded locking pin 246a, a lock housing 246b, and a spring 246c. According to various embodiments, a tensioning rod 269 of the delivery apparatus 260 may be removably coupled to the locking component 246.

As illustrated in FIG. 6A, in stage I, the prosthetic valve implant 200 and the delivery apparatus 260 may be pre-assembled during manufacturing. Further, stages II-V of FIG. 6B to FIG. 6E depict the locking component 246 in different positions along the stent 210 via cross section view.

Figure 6B:
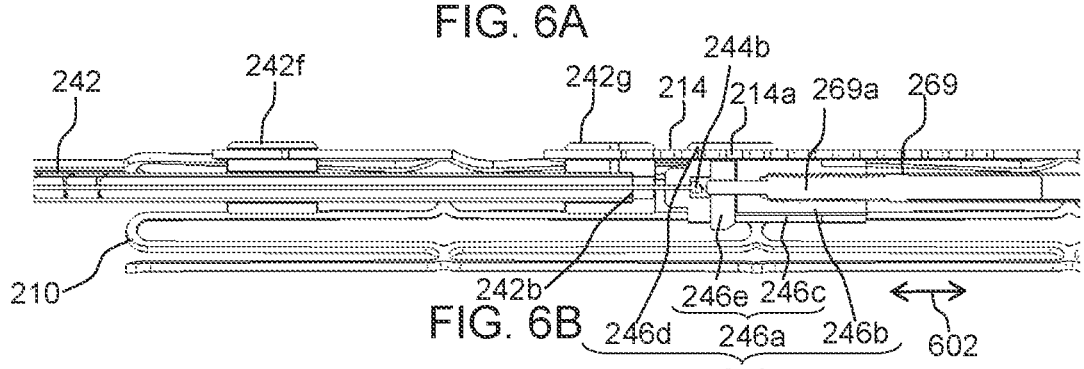
FIG. 6B to FIG. 6E show cross-sectional view of FIG. 6A illustrating different stages of operations of the locking component of the tensioning unit according to various embodiments.

As illustrated in FIG. 6B, in stage II, the tensioning rod 269 may be threaded into the lock housing 246b and inserted through the spring-loaded locking pin 246a which is held in place by the spring 246c. The spring 246c may be a leaf spring. It should be noted that the spring 246c is not shown flexed in stage II of FIG. 6B. However, in actual implementation, the spring 246c is flexed. According to various embodiments, in this configuration, the tensioning rod 269 and locking component 246 may be translatable along the stent 210 (or in a direction parallel to an axis of the stent 210), see arrow 602, to modify the amount of curvature in the flexible hollow tubing 242 of the tensioning unit 240.

Figure 6C:
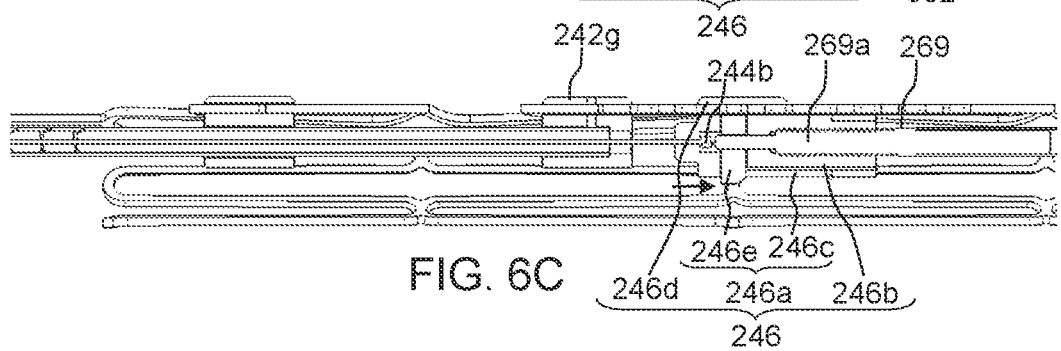

As illustrated in FIG. 6C, in stage III, the tensioning rod 269 and locking component 246 may be translated along the stent 210 away from the second end 242b of the flexible hollow tubing 242 for modifying the amount of curvature in the flexible hollow tubing 242 of the tensioning unit 240.

Figure 6D:
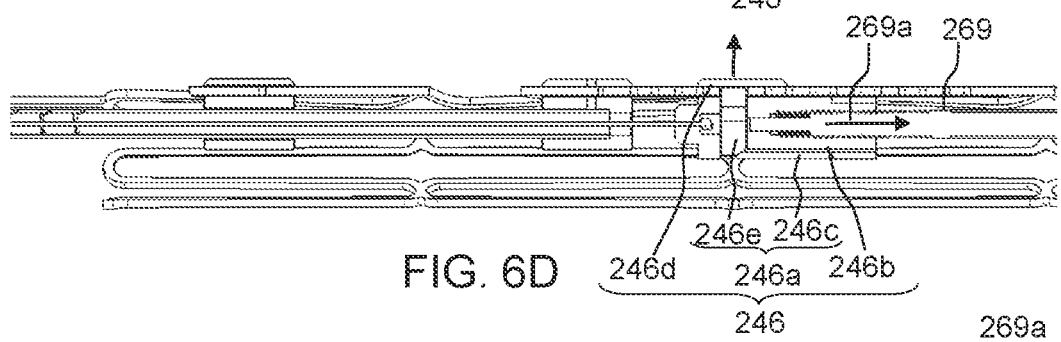

As illustrated in FIG. 6D, in stage IV, once the tensioning unit 240 is in the desired positon and/or orientation (i.e. the valve leaflet prosthesis 230 is positioned in the TV), the tensioning rod 269 may be partially unthreaded to allow the spring-loaded locking pin 246a to engage with the holes 214a in a slider strut 214 of the stent 210 while maintaining the tension in the tensioning unit 240. According to various embodiments, additional tensioning force or pulling force may be applied to the tensioning rod 269 verify whether the locking component 246 is locked in position before proceeding to disconnect the tensioning rod 269 from the locking component 246.

Figure 6E:
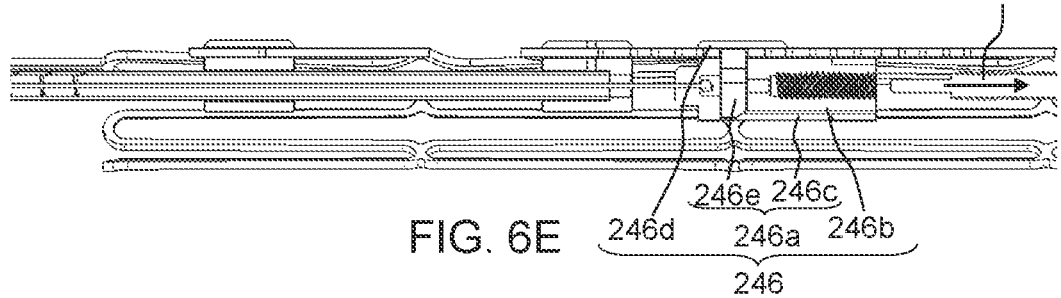
Figure 6F:
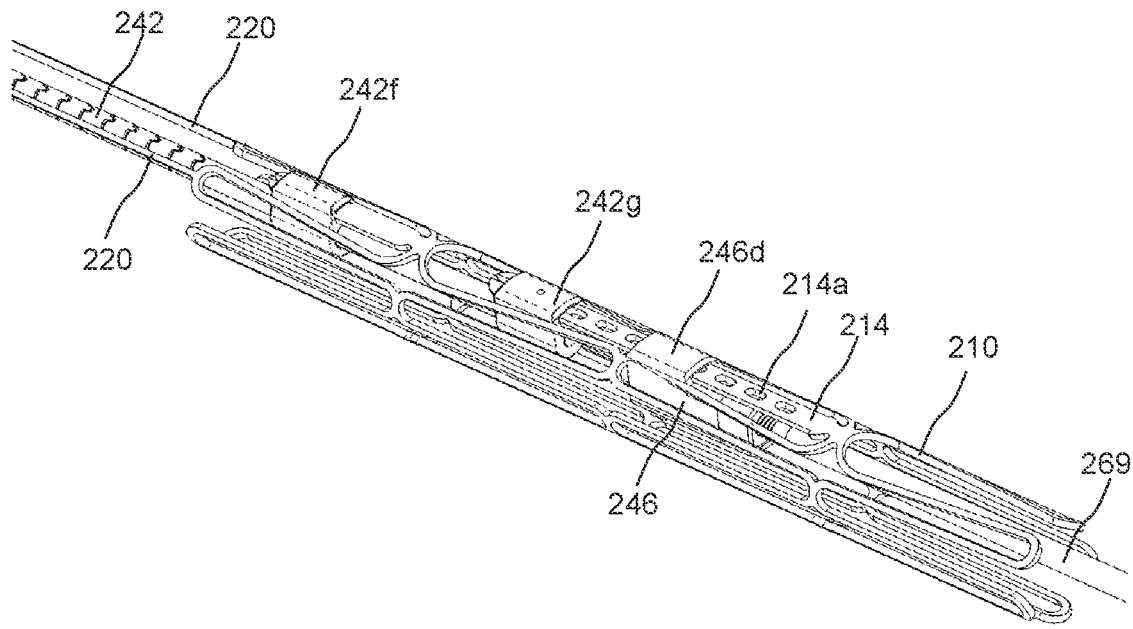
FIG. 6F shows a perspective view of the stent of the prosthetic valve implant of FIG. 2 according to various embodiments.
Figure 6G:
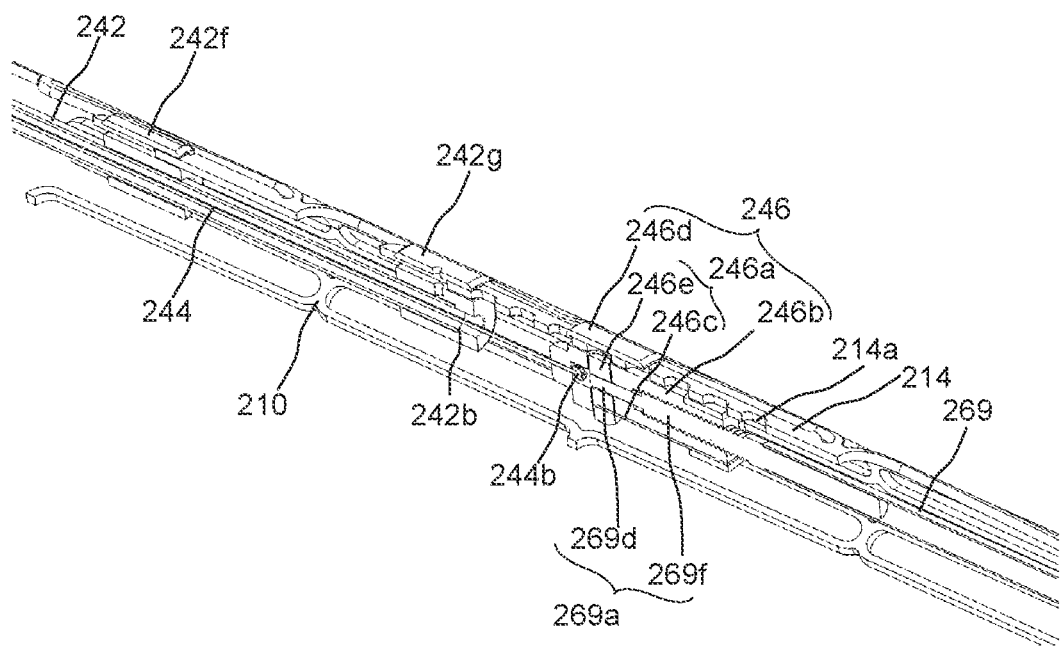
FIG. 6G shows a cut view of the stent of FIG. 6F to illustrate the locking component according to various embodiments.

As illustrated in FIG. 6E, in stage V, complete disconnection may be achieved by fully unthreading the tensioning rod 269 from the locking component 246. According to various embodiments, this may allow the stent 210, along with the prosthetic valve implant 200, to be completely deployed and the delivery apparatus 260 to be removed. According to various embodiments, the spring 246c may keep the spring-loaded locking pin 246a engaged with the slider strut 214 of the stent 210.

According to various embodiments, the stent 210 may include the slider strut 214 and the locking component 246 of the tensioning unit 240 may include the lock housing 246b having a slider bracket 246d with a gap therebetween. Accordingly, the slider strut 214 may be fitted through or inserted through the gap between the lock housing 246b and the slider bracket 246d of the locking component 246 such that the locking component 246 may be in sliding engagement with the slider strut 214 of the stent 210. Hence, the lock housing 246b and the slider bracket 246d of the locking component 246 may surround the slider strut 214 of the stent 210 so as to be slidable along the slider strut 214 of the stent 210.

According to various embodiments, the slider strut 214 of the stent 210 may include a plurality of locking holes 214a. According to various embodiments, the plurality of locking holes 214a of the slider strut 214 may be lined at regular intervals longitudinally along the slider strut 214. Accordingly, the plurality of locking holes 214a may from a straight row longitudinally along the slider strut 214. According to various embodiments, the spring-loaded locking pin 246a of the locking component 246 of the tensioning unit 240 may be directed perpendicularly to the slider strut 214. Accordingly, a direction of loading of the spring-loaded locking pin 246a may be perpendicular to the slider strut 214. According to various embodiments, the locking component 246 may be operable to hold the spring-loaded locking pin 246a in a retracted position within the lock housing 246b for sliding the locking component 246 relative to the slider strut 214. Accordingly, when the spring-loaded locking pin 246a is in the retracted position, the spring-loaded locking pin 246a may be fully enclosed within the lock housing 240b such that the locking component 246 may be slidable along the slider strut 214. According to various embodiments, the locking component 246 may be operable to release the spring-loaded locking pin 246a to protrude from the lock housing 246b into a protruded position for engaging with at least one of the plurality of locking holes 214a of the slider strut 214 to lock the locking component 246 to the slider strut 214 of the stent 210. Accordingly, when the spring-loaded locking pin 246a is in the protruded position, a tip of the spring- loaded locking pin 246a may be protruding from the lock housing 246b so as to engage or be inserted into at least one of the plurality of locking holes 214a of the slider strut 214 for locking the locking component 246 against sliding with respect to the slider strut 214 of the stent 210.

According to various embodiments, the spring-loaded locking pin 246a may include a pin 246e and the spring 246c in the form of the leaf spring, wherein the pin 246e may be coupled to a free end of the spring 246c and another end of the spring 246c may be fixedly coupled to the lock housing 246b of the locking component 246. Accordingly, the spring 246c may provide a biasing force to push the pin 246e from the retracted position towards the protruded position. Hence, the spring 246c may bias the pin 246e in a direction perpendicular to the slider strut 214 of the stent 210.

According to various embodiments, in the protruded position, the spring-loaded locking pin 246a may protrude from the lock housing 246b into the gap between the slider bracket 246d and the lock housing 246b. Accordingly, the spring-loaded locking pin 246a may be aligned with the slider bracket 246d such that, when the spring-loaded locking pin 246a is in the protruded position, the spring-loaded locking pin 246a may protrude from the lock housing 246b and extend between the lock housing 246b and the slider bracket 246d. Hence, the spring-loaded locking pin 246a may extend across the gap between the slider bracket 246d and the lock housing 246b. Thus, the spring-loaded locking pin 246a may be inserted or fitted through one of the plurality of locking holes 214a of the slider strut 214 between the lock housing 246b and the slider bracket 246d to lock the locking component 246 to the slider strut 214 of the stent 210.

Figure 7:
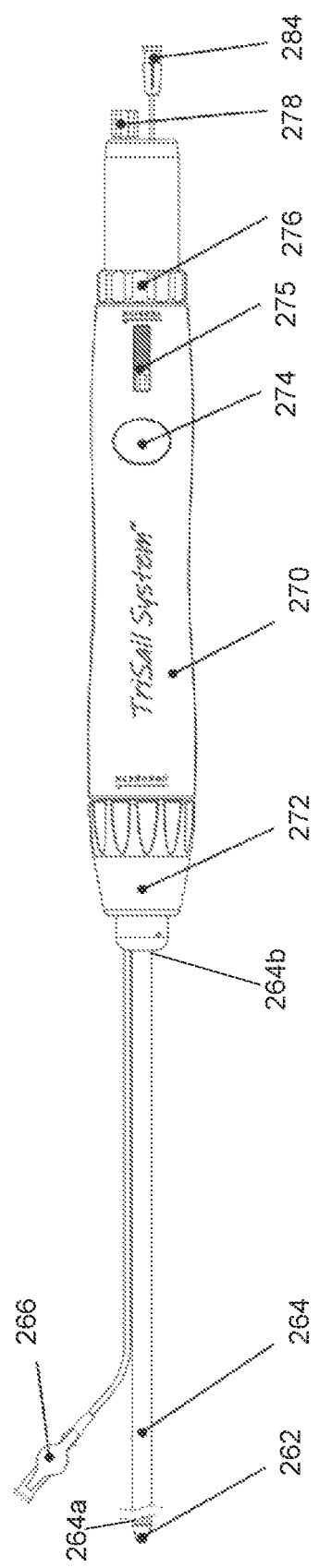
FIG. 7 shows a delivery apparatus according to various embodiments.

FIG. 7 shows the delivery apparatus 260 (or the delivery system handle) according to various embodiments. According to various embodiments, the delivery apparatus 260 may provide multiple functions during the preparation and implantation of the prosthetic valve implant 200 and may provide a controlled implantation allowing retrieval if needed. According to various embodiments, the delivery apparatus 260 may include a nosecone 262. The nosecone 262 may guide the delivery of the prosthetic valve implant 200 into position, for example over a guide wire, into the RA. According to various embodiments, the delivery apparatus 260 may include an outer sheath 264. The outer sheath 264 may constrains the prosthetic valve implant 200 and may enclose an inner catheter (not shown). According to various embodiments, the delivery apparatus 260 may include a flush-port 266. The flush-port 266 may allow flushing of the delivery apparatus 260 with saline to remove all air from the inner catheter and the prosthetic valve implant 200. According to various embodiments, the delivery apparatus 260 may include a control handle 270 (or a handle body). The control handle 270 may provide support during use. According to various embodiments, the control handle 270 may include a sheath control interface 272 (or a user adjustable input element for the sheath), for example in the form of a dial (or a sheath dial). The sheath control interface 272 in the form of the dial may retract the outer sheath 264 upon rotation and slowly exposes the prosthetic valve implant 200. According to various embodiments, the control handle 270 may include a limit control interface 274 (or a user adjustable input element for removing a limit), for example in the form of a release button. When the limit control interface 274 is not activated, accidental release of the prosthetic valve implant 200 may be prevented by limiting or preventing the outer sheath 264 from fully retracting. Only upon activating the limit control interface 274 (or pushing the release button), the limit may be removed and the outer sheath 264 may be fully retracted to expose the prosthetic valve implant 200. According to various embodiments, the control handle 270 may include an elongated window 275 (or a tension window) to provide visual indication or display as a representation of an amount of tension present in the tensioning unit 240. According to various embodiments, the control handle 270 may include a tension control interface 276 (or a user adjustable input element for controlling tension), for example in the form of a Tension Dial. According to various embodiments, the tension control interface 276 may adjust the amount of tension in the tensioning unit 240 upon rotation. According to various embodiments, the control handle 270 may include a decouple control interface 278 (or a user adjustable input element for decoupling the delivery apparatus 260) in the form of a release Knob. According to various embodiments, the decouple control interface 278 may disconnect the delivery apparatus 260 from the locking component 246 of the tensioning unit 240 of the prosthetic valve implant 200. According to various embodiments, the delivery apparatus 260 may include a guide wire luer 268, for example at the control handle 270, to allow flushing of air inside the guide wire lumen.

Figure 8A:
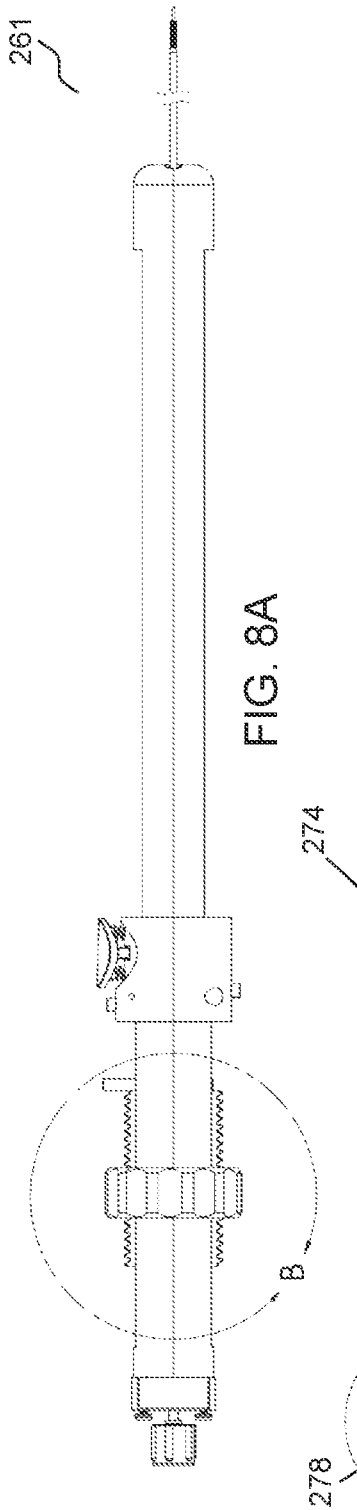
FIG. 8A shows a side view of a control handle with a tensioning rod to
illustrate the tensioning mechanism of the delivery apparatus of FIG. 7 according to various embodiments.
Figure 8B:
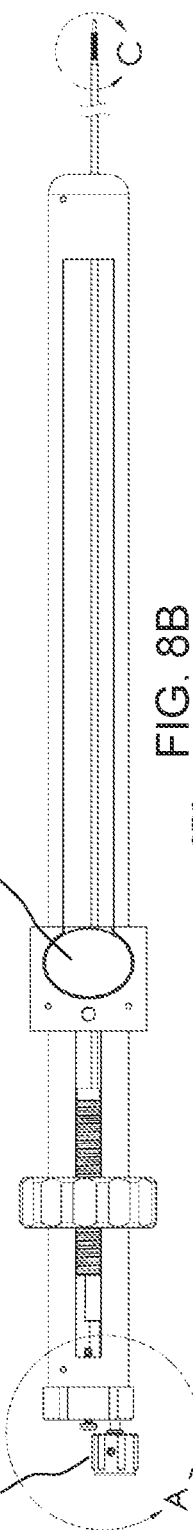
FIG. 8B shows a top view of FIG. 8A according to various embodiments.
Figure 8E:
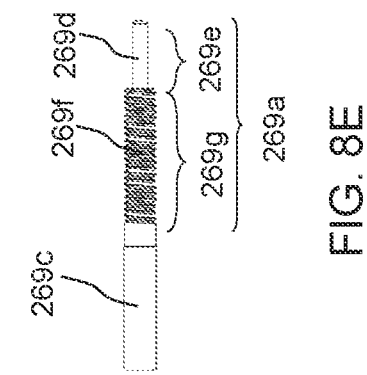
FIG. 8E shows details of a first end portion of the tensioning rod marked by circle C in FIG. 8B according to various embodiments.
Figure 8D:
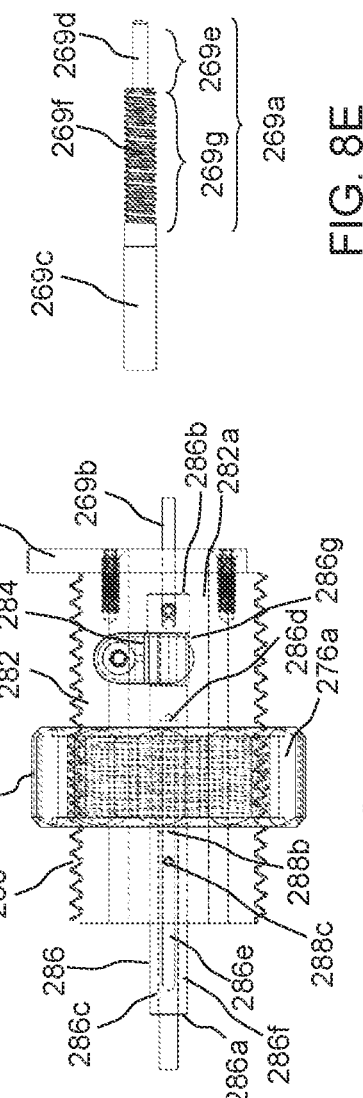
FIG. 8D shows a see-through view of the mechanism marked by circle B in FIG. 8A according to various embodiments.
Figure 8C:
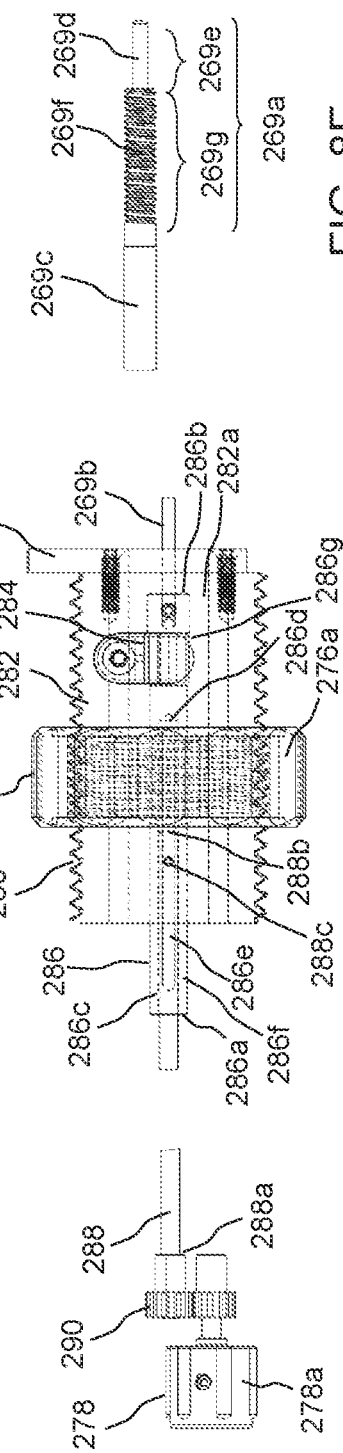
FIG. 8C shows details of the mechanism marked by circle A in FIG. 8B according to various embodiments.

FIG. 8A shows a side view of the control handle 270 with the tensioning rod 269 to illustrate the tensioning mechanism 261 of the delivery apparatus 260 according to various embodiments. FIG. 8B shows a top view of FIG. 8A according to various embodiments. FIG. 8C shows details of the mechanism marked by circle A in FIG. 8B according to various embodiments. FIG. 8D shows a see-through view of the mechanism marked by circle B in FIG. 8A according to various embodiments. FIG. 8E shows details of a first end portion 269a of the tensioning rod 269 marked by circle C in FIG. 8B according to various embodiments. According to various embodiments, the tensioning mechanism 261 serve to apply precise amounts tension to the tensioning rod 269 and provide a method to safely disconnect the locking component 246 from the tensioning rod 269. According to various embodiment, the tensioning mechanism 261 may facilitate the implantation procedure in maintaining the position of the valve leaflet prosthesis 230 during and after the implantation of the prosthetic valve implant 200.

According to various embodiments, the tensioning mechanism 261 may be contained within the delivery apparatus 260. According to various embodiments, the tensioning mechanism 261 may include the tensioning rod 269 having the first end portion 269a (or a distal end) and a second end portion 269b (or a proximal end), a tensioning rod tubing 269c, an indicator plate 263, a shaft-coupling-support bracket 284 (or a tension plate), a lead screw 282 (or a tension driver), the tension control interface 276 (or the tension dial), a shaft coupling 286 (or a tension interface), a transmission shaft 288 (or a gear shaft), a release gears assembly 290 (or release gears), and the decouple control interface 278 (or the release knob).

According to various embodiments, a tensioning rod subassembly may include the tensioning rod 269 having the first end portion 269a (or a distal end) and the second end portion 269b (or a proximal end), the tensioning rod tubing 269c, the shaft coupling 286 (or a tension interface), the transmission shaft 288 (or a gear shaft), the release gears assembly 290 (or release gears), and the decouple control interface 278 (or the release knob). According to various embodiments, the transmission shaft 288 may include a pin 288c that slides axially within a slot 286e of the shaft coupling 286. Accordingly, when the decouple control interface 278 is rotated, the rotation is transmitted through all the connected components of the tensioning rod subassembly. Hence, the first end portion 269a of the tensioning rod 269 may be threaded or unthreaded from the locking component 246.

According to various embodiments, the shaft-coupling-support bracket 284 may be attached to the lead screw 282. Further, the shaft-coupling-support bracket 284 may be coupled to the second end portion 269b of the tensioning rod 269 and may allow the shaft coupling 286 to freely rotate. Accordingly, when the tension control interface 276 is rotated, the lead screw 282 may be translated along the control handle 270 so as to translate the tensioning rod 269 along a rod axis of the tensioning rod 269 for adjusting the tension in the tensioning unit 240.

According to various embodiments, the outer sheath 264 of the delivery apparatus 260 may compress and constrain the prosthetic valve implant 200 within a first end portion 264a (or a distal portion) of the outer sheath 264. Accordingly, the prosthetic valve implant 200 may be fitted and inserted into the outer sheath 264 of the delivery apparatus 260 in a compacted state or compressed state, and be located at the first end portion 264a (or the distal portion) of the outer sheath 264. The first end portion 264a (or the distal portion) of the outer sheath 264 may be inserted into the patient.

According to various embodiments, the tensioning rod 269 of the delivery apparatus 260 may be enclosed within the outer sheath 264. Further, the tensioning rod 269 may have the first end portion 269a removably coupled to the second end 244b of the tensioning wire 244 of the tensioning unit 240 of the prosthetic valve implant 200. For example, the first end portion 269a of the tensioning rod 269 may be coupled to the second end 244b of the tensioning wire 244 of the tensioning unit 240 via the locking component 246. Accordingly, the first end portion 269a of the tensioning rod 269 may be connected to the locking component 246 and the second end 244b of the tensioning wire 244 of the tensioning unit 240 in a manner so as to be removable.

According to various embodiments, the delivery apparatus 260 may include the control handle 270 at the second end portion 264b (or the proximal portion) of the outer sheath 264. Accordingly, the second end portion 264b of the outer sheath 264 may be coupled to the control handle 270. For example, the second end portion 264b of the outer sheath 264 may be connected to a sheath retraction mechanism within the control handle 270. Hence, the sheath retraction mechanism of the control handle 270 may retract the outer sheath 264 relative to the control handle 270.

According to various embodiments, the control handle 270 may include the sheath control interface 272 associated with the second end portion 264b of the outer sheath 264. The sheath control interface 272 may be operable to retract the outer sheath 264 for deploying the prosthetic valve implant 200. Accordingly, the sheath control interface 272 may be operated to move the second end portion 264b of the outer sheath 264 further into the control handle 270 for retracting the outer sheath 264 relative to the control handle 270.

According to various embodiments, the control handle 270 may include the tension control interface 276 associated with the second end portion 269b of the tensioning rod 269. The tension control interface 276 may be operable to retract or extend the tensioning rod 269 with respect to the control handle 270. Accordingly, the tension control interface 276 may be operated to move the second end portion 269b of the tensioning rod 269 so as to retract or extend the tensioning rod 269 relative to the control handle 270. According to various embodiments, since the first end portion 269a of the tensioning rod 269 is coupled to the second end 244b of the tensioning wire 244 via the locking component 246, moving the tensioning rod 269 may move the second end 244b of the tensioning wire 244 relative to the flexible hollow tubing 242 of the tensioning unit 240 so as to adjust a displacement of the second end 244b of the tensioning wire 244 from the second end 242b of the flexible hollow tubing 242 to correspondingly adjust a degree of bending of the flexible hollow tubing 242 and a degree of bending of the at least one resilient tethering strut 220 for positioning the valve leaflet prosthesis 230 relative to the stent 210. Accordingly, operating the tension control interface 276 may move the tensioning rod 269 of the delivery apparatus 260 which may in turn move the tensioning wire 244 of the prosthetic valve implant 200 so as to bend or flex the flexible hollow tubing 242 of the tensioning unit 240 and the at least one resilient tethering strut 220 for positioning the valve leaflet prosthesis 230 relative to the stent 210.

According to various embodiments, the control handle 270 may include the decouple control interface 278 associated with the second end portion 269b of the tensioning rod 269. The decouple control interface 278 may be operable to decouple or detach or disconnect the first end portion 269a of the tensioning rod 269 from the second end 244b of the tensioning wire 244 of the tensioning unit 240 of the prosthetic valve implant 200. Accordingly, the decouple control interface 278 may be operated such that the first end portion 269a of the tensioning rod 269 may decouple or detach or disconnect from the locking component 246 fixed at the second end 244b of the tensioning wire 244 of the tensioning unit 240.

According to various embodiments, with the locking component 246 having the spring-loaded locking pin 246a and the lock housing 246b, the first end portion 269a of the tensioning rod 269 may include a retaining element 269d in engagement with the spring-loaded locking pin 246a of the locking component 246. Accordingly, when the retaining element 269d is engaged with the spring-loaded locking pin 246a of the locking component 246, the retaining element 269d of the tensioning rod 269 may hold the spring-loaded locking pin 246a in the retracted position. In the retracted position, the spring-loaded locking pin 246a may be fully within the lock housing 246b. According to various embodiments, the retaining element 269d may be withdrawable to disengage from the spring-loaded locking pin 246a of the locking component 246 so as to release the spring-loaded locking pin 246a for engaging the slider strut 214. Accordingly, the retaining element 269d may be removed from the spring-loaded locking pin 246a of the locking component 246 such that the spring-loaded locking pin 246a of the locking component 246 may move from the retracted position to the protruded position so as to engage the slider strut 214 for locking the locking component 246 to the slider strut 214.

According to various embodiments, the first end portion 269a of the tensioning rod 269 may include an insert tip portion 269e serving as the retaining element 269d. According to various embodiments, the retaining element 269d may be in the form of the insert tip portion 269e. According to various embodiments, the insert tip portion 269e may be inserted perpendicularly to the spring-loaded locking pin 246a to hold the spring-loaded locking pin 246a in the retracted position. Accordingly, the pin 246e of the spring-loaded locking pin 246a may include a transverse hole. The insert tip potion 269e of the tensioning rod 269 may be inserted into the transverse hole of the pin 246e of the spring-loaded locking pin 246a when the spring-loaded locking pin 246a is in the retracted position so as to hold or retain the spring-loaded locking pin 246a is in the retracted position. According to various embodiments, the insert tip portion 269e of the tensioning rod 269 may be withdrawable to release the spring-loaded locking pin 246a for engaging the slider strut 214. Accordingly, the insert tip portion 269e of the tensioning rod 269 may be removed from the transverse hole of the pin 246e of the spring-loaded locking pin 246a of the locking component 246 such that the pin 246e of the spring-loaded locking pin 246a of the locking component 246 may move from the retracted position to the protruded position so as to engage the slider strut 214 for locking the locking component 246 to the slider strut 214.

According to various embodiments, the first end portion 269a of the tensioning rod 269 may include a coupling element 269f in engagement with the locking component 246 to removably couple the first end portion 269a of the tensioning rod 269 to the locking component 246. According to various embodiments, the coupling element 269f of the tensioning rod 269 may be configured for removable coupling with the locking component 246. According to various embodiments, the first end portion 269a of the tensioning rod 269 may include a threaded stem portion 269g serving as the coupling element 269f. According to various embodiments, the threaded stem portion 269g may be adjacent the insert tip portion 269e. Accordingly, the threaded stem portion 269g may be next to or immediately adjacent the insert tip portion 269e along the first end portion 269a of the tensioning rod 269. According to various embodiments, the threaded stem portion 269g may be screwed into the lock housing 246b of the locking component 246 so as to removably couple the tensioning rod 269 to the locking component 246. According to various embodiments, when the threaded stem portion 269g is screwed into the lock housing 246b, the inset tip portion 269e of the tensioning rod 269 may be inserted perpendicularly to the spring-loaded locking pin 246a in the retracted position. Accordingly, with the threaded stem portion 269g screwed into the lock housing 246b, the inset tip portion 269e of the tensioning rod 269 may be inserted into the transverse hole of the pin 246e of the spring-loaded locking pin 246a.

According to various embodiments, the threaded stem portion 269g may be capable of being partially unscrewed with respect to the lock housing 246b of the locking component 246 to withdraw the insert tip portion 269e from the spring-loaded locking pin 246a so as to release the spring-loaded locking pin. Accordingly, when the threaded stem portion 269g is partially unscrewed from the lock housing 246b of the locking component 246, the insert tip portion 269e may be fully withdrawn out of the transverse hole of the pin 246e of the spring-loaded locking pin 246a such that the pin 246e of the spring-loaded locking pin 246a may be moved from the retracted position to the protruded position for engaging with the slider strut 214 to lock the locking component 246 to the slider strut 214. The threaded stem portion 269g is partially unscrewed when part of the threaded stem portion 269g remains screwed to the lock housing 246b and part of the threaded stem portion 269g is not screwed or engaged to the lock housing 246b. For example, the threaded stem portion 269g may be partially unscrewed when about half of the threaded stem portion 269g remains screwed to the lock housing 246b and half of the threaded stem portion 269g is not screwed to or is outside the lock housing 246b.

According to various embodiments, the threaded stem portion 269g may be capable of being of fully unscrewed from the lock housing 246b of the locking component 246 to decouple the first end portion 269a of the tensioning rod 269 from the locking component 246. When the threaded stem portion 269g is fully unscrewed from the lock housing 246b, the tensioning rod 269 may be fully decoupled or detached or separated from the locking component 246 such that they are no longer in contact with each other. Accordingly, when the threaded stem portion 269g is fully unscrewed from the lock housing 246b of the locking component 246, the threaded stem portion 269g may be fully outside the lock housing 246b of the locking component 246.

According to various embodiments, tension control interface 276 of the control handle 270 of the delivery apparatus 160 may be a rotatable dial 276a. The rotatable dial 276a may be rotatable about the control handle 270. According to various embodiments, the control handle 270 may be of an elongated shape. Accordingly, the rotatable dial 276a may be rotatable about a longitudinal axis of the control handle 270. According to various embodiments, the control handle 270 may include a rotary to linear mechanism 280 interconnecting the rotatable dial 276a and the tensioning rod 269 to convert a rotary motion of the rotatable dial 276a to a linear translation motion of the tensioning rod 269. According to various embodiments, the rotary to linear mechanism 280 may connect the rotatable dial 276a to the second end portion 269b of the tensioning rod 269. Accordingly, the rotary to linear mechanism 280 may translate or move the second end portion 269b of the tensioning rod 269 linearly upon receiving a rotary input from the rotatable dial 276a.

According to various embodiments, the rotatable dial 276a serving as the tension control interface 276 of the control handle 270 may include internal screw threads. Accordingly, the internal screw threads may be along an internal wall of the rotatable dial 276a. According to various embodiments, the rotary to linear mechanism 280 may include the lead screw 282 with external screw threads. Accordingly, the external screw threads of the lead screw 282 may be in engagement with the internal screw threads of the rotatable dial 276a. According to various embodiments, due to the engagement between the external screw threads of the lead screw 282 and the internal screw threads of the rotatable dial 276a, the lead screw 282 may translate or move linearly along the longitudinal axis of the control handle 270 as the rotatable dial 276a is rotated about the longitudinal axis of the control handle 270. Hence, the rotary motion of the rotatable dial 276a may be converted into a linear translation motion of the lead screw 282 by a screw engagement between the rotatable dial 276a and the lead screw 282. According to various embodiments, the second end portion 269b of the tensioning rod 269 may be coupled to the lead screw 282 such that the tensioning rod 269 may be translatable linearly together with the lead screw 282. Accordingly, with the second end portion 269b of the tensioning rod 269 coupled to the lead screw 282, the linear translation motion of the lead screw 282 may be imparted to the tensioning rod 269.

According to various embodiments, the indicator plate 263 of the control handle 270 may be fixedly coupled to the lead screw 282 of the rotary to linear mechanism 280. According to various embodiments, the elongated window 275 of the control handle 270 may be aligned lengthwise with respect to the control handle 270. According to various embodiments, the indicator plate 263 may be arranged underneath the elongated window 275. Accordingly, when the lead screw 282 is translated linearly along the control handle 270, the indicator plate 263 may move along the elongated window 275. Hence, the elongated window 275 may be for viewing the indicator plate 263 as the lead screw 282 translates linearly along the longitudinal axis of the control handle 270. Thus, the linear translation of the lead screw 282 may be observed by viewing the movement of the indicator plate 263 through the elongated window 275. When the tensioning rod 269 is coupled to the locking component 246 and the rotatable dial 276a is rotated to move the lead screw 282 for moving the tensioning rod 269 to provide a tension to the tensioning unit 240, the indicator plate 263 and the elongated window 275 may provide visual indication or display as a representation of an amount of tension present in the tensioning unit 240.

According to various embodiments, the decouple control interface 278 of the control handle 270 may be a knob 278a. The knob 278a may be coupled to the transmission shaft 288 extending longitudinally within the control handle 270. Accordingly, the knob 278a may be rotatable so as to rotate the transmission shaft 288. According to various embodiments, a first end 288a of the transmission shaft 288 may be coupled to the knob 278a and a second end 288b of the transmission shaft 288 may be coupled to the second end portion 269b of the tensioning rod 269. Accordingly, a rotation of the transmission shaft 288 may be imparted to the tensioning rod 269 for rotating the tensioning rod 269 about the rod axis of the tensioning rod 269. According to various embodiments, the second end portion 269b of the tensioning rod 269 may be coupled to second end 288b of the transmission shaft 288 in a coaxial manner. According to various embodiments, the knob 278a may be coupled to the first end 288a of the transmission shaft 288 via the release gears assembly 290. According to various embodiments, the release gears assembly 290 may include two or more gears. For example, the release gears assembly 290 may include at least two gears arranged side-by-side with parallel rotational axes.

According to various embodiments, the lead screw 282 of the rotary to linear mechanism 280 may be hollow. Accordingly, the lead screw 282 may include a through-channel 282a extending longitudinally therethrough. Hence, the through-channel 282a may go completely through the lead screw 282 in the lengthwise direction from a longitudinal end to another longitudinal end. According to various embodiments, the control handle 270 may include the shaft coupling 286. The shaft coupling 286 may be disposed so as to be surrounded by the lead screw 282. Accordingly, the shaft coupling 286 may be introduced into the through-channel 282a of the lead screw 282. Hence, the shaft coupling 286 may extend into or extend within the through-channel 282a of the lead screw 282. According to various embodiments, the shaft coupling 286 may be interconnecting the second end 288b of the transmission shaft 288 and the second end portion 269b of the tensioning rod 269 through the through-channel 282a of the lead screw 282. Accordingly, the tensioning rod 269, the shaft coupling 286 and the transmission shaft 288 may be connected to each other so as to extend through the through-channel 282a of the lead screw 282. Hence, when the tensioning rod 269, the shaft coupling 286 and the transmission shaft 288 are connected to each other, the lead screw 282 may surround at least part of the connection thereof.

According to various embodiments, the shaft coupling 286 may include an elongated body 286c having a first end 286a and a second end 286b. According to various embodiments, the elongated body 286c of the shaft coupling 186 may include a hole 286d extending longitudinally into the elongated body 286c from the first end 286a of the elongated body 286c. According to various embodiments, the elongated body 286c of the shaft coupling 186 may include a longitudinal slot 286e along a wall 286f of the hole 286d. Accordingly, the longitudinal slot 286d may be parallel to the hole 286d and may provide access to the hole 286d along a length of the hole 286d. According to various embodiments, the second end 288b of the transmission shaft 288 may be inserted into the hole 286d from the first end 286a of the elongated body 286c. According to various embodiments, the second end 288b of the transmission shaft 288 may include a pin 288c protruding perpendicularly from the second end 288b of the transmission shaft 288. According to various embodiments, the pin 288c may protrude or fit or be inserted into the longitudinal slot 286e to form a slidable pin-slot joint. Accordingly, the shaft coupling 286 and the transmission shaft 288 may be connected in a manner so as to be slidable relative to each other.

According to various embodiments, the second end portion 269b of the tensioning rod 269 may be fixedly coupled to the second end 286b of the elongated body 286c of the shaft coupling 286. Accordingly, the tensioning rod 269 may be firmly attached or securely fastened to the shaft coupling 286. Hence, the shaft coupling 286 and the tensioning rod 269 may be moved together.

According to various embodiments, the shaft-coupling-support bracket 284 of the control handle 270 may be fixed to an inner wall surface of the lead screw 282. Accordingly, the lead screw 282 and the shaft-coupling-support bracket 284 may be be firmly attached or securely fastened together. According to various embodiments, the shaft coupling 286 may be fitted through the shaft-coupling-support bracket 284 in a manner such that the shaft coupling 286 is rotatable about a longitudinal axis of the shaft coupling 286 for rotating the tensioning rod 269 about the rod axis and is non-movable along the longitudinal axis of the shaft coupling 286 with respect to the lead screw 282 such that the tensioning rod 269 is translatable linearly together with the lead screw 282. Accordingly, the shaft coupling 286 is coupled to the shaft-coupling-support bracket 284 such that the shaft coupling 286 is rotatable about its longitudinal axis but is non-translatable along its longitudinal axis with respect to the shaft-coupling-support bracket 284.

According to various embodiments, the elongated body 286c of the shaft coupling 186 may include a neck section 286f or a circumferential groove which is of a smaller diameter. The shaft-coupling-support bracket 284 may include a break or an opening to be fitted to the neck section 286f or the circumferential groove of the shaft coupling 186 so as to circle around the neck section 286f or the circumferential groove such that the shaft coupling 186 is rotatable about its longitudinal axis within the break or the opening of the shaft-coupling-support bracket 284. Further, the shaft coupling 186 may be non-translatable along its longitudinal axis with respect to the shaft-coupling-support bracket 284 as the sides of the shaft-coupling-support bracket 284 may be abutting the side walls of the neck section or the circumferential groove of the shaft coupling 186.

According to various embodiments, there is provided a prosthetic implant delivery system including the prosthetic valve implant 200 and the delivery apparatus 260.

In various embodiments, a delivery system has been provided with an ability to adjust the valve leaflet prosthesis relative to the TV and control the motion of the valve leaflet prosthesis to maximize the reduction in TR and also to provide a safe and controlled method of maintaining the position of the valve leaflet prosthesis upon removal of the delivery apparatus.

The above disclosure will enable one of ordinary skill in the art to practice the invention. The disclosure provides a disclosure of embodiments of the invention. However, the embodiments do not limit the invention to the exact construction, dimensional relationships, and operation shown and described. Modifications, alternative constructions, changes and equivalents will readily occur to those skilled in the art and may be employed, as suitable, without departing from the scope of the invention. Therefore, the above description and illustrations should not be construed as limiting the scope of the invention. The scope of the invention is thus indicated by the appended statements and all changes which come within the meaning and range of equivalency of the statements are therefore intended to be embraced.

The invention claimed is:

1. A prosthetic implant comprising
an anchor member;
at least one resilient tethering strut extending from the anchor member;
a coaptation structure coupled to an end of the at least one resilient tethering strut away from the anchor member; and
a tensioning unit extending between the anchor member and the coaptation structure, the tensioning unit comprises
a flexible hollow tubing extending between the anchor member and the coaptation structure, and
a tensioning wire extending through the flexible hollow tubing with a first end of the tensioning wire fixed at a junction between a first end of the flexible hollow tubing and the coaptation structure and with a second end of the tensioning wire extending out from a second end of the flexible hollow tubing,
wherein the second end of the tensioning wire is drawable relative to the flexible hollow tubing to be pulled away from the second end of the flexible hollow tubing to bend the flexible hollow tubing in a manner so as to correspondingly bend the at least one resilient tethering strut to move the coaptation structure relative to the anchor member.

2. The prosthetic implant as claimed in claim 1, further comprising
a coupler coupling the coaptation structure to the end of the at least one resilient tethering strut, the coupler having a first connection end to receive the coaptation structure and a second connection end to receive the end of the at least one resilient tethering strut,
wherein a main axis of the coupler extends between the first connection end and the second connection end,
wherein the coaptation structure is fitted to the first connection end of the coupler with rotational play about the main axis of the coupler and pivoting play about a transverse axis perpendicular to the main axis of the coupler.

3. The prosthetic implant as claimed in claim 2,
wherein the coaptation structure comprises a pair of L-shaped connection legs with feet pointing in opposite directions away from each other,
wherein the coupler comprises a hollow coupler body comprising a first opening at the first connection end and a pair of side-holes in opposite wall portions of the hollow coupler body, wherein the pair of side-holes are coaxial with the transverse axis, wherein a height of the first opening in a height direction perpendicular to the main axis and the transverse axis is larger than a thickness of the pair of L-shaped connection legs,
wherein the pair of L-shaped connection legs of the coaptation structure is inserted into the first opening at the first connection end of the coupler with the feet of the pair of L-shaped connection legs respectively fitted into the pair of side-holes.

4. The prosthetic implant as claimed in claim 3,
wherein the end of the at least one resilient tethering strut comprises a pin-hole or key-hole,
wherein the hollow coupler body of the coupler comprises a second opening at the second connection end and a corresponding pin-hole or key-hole in a wall portion of the hollow coupler body,
wherein the end of the at least one resilient tethering strut is inserted into the second opening at the second connection end of the coupler and a locking pin or key is inserted through the corresponding pin-hole or key-hole of the hollow coupler body of the coupler and into the pin-hole or key- hole of the end of the at least one resilient tethering strut to lock the at least one resilient tethering strut to the coupler,
wherein the locking pin or key has a spacer portion inserted between the pair of L-shaped connection legs of the coaptation structure to keep the pair of L-shaped connection legs apart so as to retain the feet of the pair of L-shaped connection legs respectively fitted into the pair of side-holes of the hollow coupler body.

5. The prosthetic implant as claimed in claim 1, wherein the first end of the flexible hollow tubing of the tensioning unit is coupled to the end of the at least one resilient tethering strut and the second end of the flexible hollow tubing of the tensioning unit is coupled to the anchor member.

6. The prosthetic implant as claimed in claim 1, wherein the tensioning unit further comprises
    a locking component fixed at the second end of the tensioning wire, the locking component being movable relative to the anchor member to draw the second end of the tensioning wire relative to the flexible hollow tubing for pulling the second end of the tensioning wire away from the second end of the flexible hollow tubing,
    wherein the locking component is lockable to the anchor member so as to fix the second end of the tensioning wire, when a desired displacement from the second end of the flexible hollow tubing is reached, in a manner such that a curvature of the flexible hollow tubing, a curvature of the at least one resilient tethering strut and a relative disposition of the coaptation structure with respect to the anchor member are fixed.

7. The prosthetic implant as claimed in claim 6,
    wherein the anchor member comprises a slider strut, and the locking component comprises a lock housing having a slider bracket with a gap therebetween for fitting the slider strut therethrough such that the locking component is in sliding engagement with the slider strut,
    wherein the slider strut of the anchor member comprises a plurality of locking holes lined at regular intervals longitudinally along the slider strut, wherein the locking component comprises a spring-loaded locking pin directed perpendicularly to the slider strut, wherein the locking component is operable to hold the spring-loaded locking pin in a retracted position within the lock housing for sliding the locking component relative to the slider strut and operable to release the spring-loaded locking pin to protrude from the lock housing into a protruded position for engaging with at least one of the plurality of locking holes to lock the locking component to the slider strut of the anchor member.

8. The prosthetic implant as claimed in claim 7,
    wherein the spring-loaded locking pin comprises a pin and a leaf spring, wherein the pin is coupled to a free end of the leaf spring and another end of the leaf spring is fixedly coupled to the lock housing of the locking component, and/or
    wherein, in the protruded position, the spring-loaded locking pin protrudes from the lock housing into the gap between the slider bracket and the lock housing.

9. The prosthetic implant as claimed in claim 1, wherein the flexible hollow tubing has directional flexibility.

10. The prosthetic implant as claimed in claim 9, wherein the flexible hollow tubing comprises a first sector extending continuously from the first end of the flexible hollow tubing to the second end of the flexible hollow tubing to form a spine portion, and a second sector with a plurality of spaced ribs lined at regular intervals from the first end of the flexible hollow tubing to the second end of the flexible hollow tubing to form a ribbed portion.

11. The prosthetic implant as claimed in claim 10, wherein the plurality of spaced ribs is formed by a plurality of parallel transverse cuts along second sector of the flexible hollow tubing.

12. The prosthetic implant as claimed in claim 1, wherein the anchor member comprises a stent and the coaptation structure comprises a valve leaflet prosthesis.

13. A prosthetic implant delivery system comprising:
    the prosthetic implant according to claim 7; and
    a delivery apparatus comprising
        an outer sheath with the prosthetic implant compressed and constrained within a first end portion of the outer sheath,
        a tensioning rod enclosed within the outer sheath, the tensioning rod having a first end portion removably coupled to the second end of the tensioning wire of the tensioning unit of the prosthetic implant, and
        a control handle at a second end portion of the outer sheath, the control handle comprises
            a first control interface associated with the second end portion of the outer sheath and operable to retract the outer sheath for deploying the prosthetic implant,
            a second control interface associated with a second end portion of the tensioning rod and operable to retract or extend the tensioning rod with respect to the control handle to move the second end of the tensioning wire relative to the flexible hollow tubing so as to adjust a displacement of the second end of the tensioning wire from the second end of the flexible hollow tubing to correspondingly adjust a degree of bending of the flexible hollow tubing and a degree of bending of the at least one resilient tethering strut for positioning the coaptation structure relative to the anchor member, and
            a third control interface associated with a second end portion of the tensioning rod and operable to decouple the first end portion of the tensioning rod from the second end of the tensioning wire of the tensioning unit of the prosthetic implant.

14. The prosthetic implant delivery system as claimed in claim 13, wherein the first end portion of the tensioning rod comprises a retaining element in engagement with the spring-loaded locking pin of the locking component to hold the spring-loaded locking pin in the retracted position, the retaining element being withdrawable to disengage from the spring-loaded locking pin of the locking component so as to release the spring-loaded locking pin for engaging the slider strut.

15. The prosthetic implant delivery system as claimed in claim 14, wherein the first end portion of the tensioning rod comprises a coupling element in engagement with the locking component to removably couple the first end portion of the tensioning rod to the locking component.

16. The prosthetic implant delivery system as claimed in claim 15,
    wherein the retaining element comprises an insert tip portion, wherein the insert tip portion is inserted perpendicularly to the spring-loaded locking pin to hold the spring-loaded locking pin in the retracted position, and wherein the insert tip portion is withdrawable to release the spring-loaded locking pin for engaging the slider strut
    wherein the coupling element comprises a threaded stem portion adjacent the insert tip portion, wherein the threaded stem portion is screwed into the lock housing of the locking component with the inset tip portion inserted perpendicularly to the spring-loaded locking pin in the retracted position, and wherein the threaded stem portion is capable of being partially unscrewed with respect to the lock housing of the locking component to withdraw the insert tip portion from the spring-loaded locking pin so as to release the spring-loaded locking pin and fully unscrewed from the lock housing of the locking component to decouple the first end portion of the tensioning rod from the locking component.

17. The prosthetic implant delivery system as claimed in claim 13,
- wherein the second control interface comprises a rotatable dial, the rotatable dial being rotatable about a longitudinal axis of the control handle,
- wherein the control handle comprises a rotary to linear motion mechanism interconnecting the rotatable dial and the tensioning rod to convert a rotary motion of the rotatable dial to a linear translation motion of the tensioning rod.

18. The prosthetic implant delivery system as claimed in claim 17,
- wherein the rotatable dial comprises internal screw threads,
- wherein the rotary to linear motion mechanism comprises a lead screw with external screw threads in engagement with the internal screw threads of the rotatable dial in a manner so as to translate linearly along the longitudinal axis of the control handle as the rotatable dial is rotated about the longitudinal axis of the control handle,
- wherein the second end portion of the tensioning rod is coupled to the lead screw such that the tensioning rod is translatable linearly together with the lead screw,
- wherein the control handle comprises an indicator plate fixedly coupled to the lead screw and an elongated window aligned lengthwise with respect to the control handle for viewing the indicator plate as the lead screw translates linearly along the longitudinal axis of the control handle.

19. The prosthetic implant delivery system as claimed in claim 18,
- wherein the third control interface comprises a knob to rotate a transmission shaft extending longitudinally within the control handle, wherein a first end of the transmission shaft is coupled to the knob and a second end of the transmission shaft is coupled to the second end portion of the tensioning rod in a manner so as to impart a rotation of the shaft to rotate the tensioning rod about a rod axis of the tensioning rod.

20. The prosthetic implant delivery system as claimed in claim 19,
- wherein the lead screw is hollow with a through-channel extending longitudinally therethrough,
- wherein the control handle comprises a shaft coupling interconnecting the second end of the transmission shaft and the second end portion of the tensioning rod through the through-channel of the lead screw,
- wherein the shaft coupling comprises an elongated body having a hole extending longitudinally into the elongated body from a first end of the elongated body and a longitudinal slot along a wall of the hole, wherein the second end of the transmission shaft is inserted into the hole with a pin protruding perpendicularly from the second end of the transmission shaft into the longitudinal slot to form a slidable pin-slot joint,
- wherein the second end portion of the tensioning rod is fixedly coupled to a second end of the elongated body of the shaft coupling,
- wherein the control handle comprises a shaft-coupling-support bracket fixed to an inner wall surface of the lead screw, wherein the shaft coupling is fitted through the shaft-coupling-support bracket in a manner such that the shaft coupling is rotatable about a longitudinal axis of the shaft coupling for rotating the tensioning rod about the rod axis and is non-movable along the longitudinal axis of the shaft coupling with respect to the lead screw such that the tensioning rod is translatable linearly together with the lead screw.

* * * * *